United States Patent
Kowalski et al.

(10) Patent No.: US 12,251,873 B2
(45) Date of Patent: Mar. 18, 2025

(54) THREE-DIMENSIONAL PRINTING

(71) Applicant: Hewlett-Packard Development Company, L.P., Spring, TX (US)

(72) Inventors: Mark Kowalski, Corvallis, OR (US); Tienteh Chen, San Diego, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 743 days.

(21) Appl. No.: 17/047,511

(22) PCT Filed: Oct. 5, 2018

(86) PCT No.: PCT/US2018/054626
§ 371 (c)(1),
(2) Date: Oct. 14, 2020

(87) PCT Pub. No.: WO2020/072075
PCT Pub. Date: Apr. 9, 2020

(65) Prior Publication Data
US 2021/0213532 A1 Jul. 15, 2021

(51) Int. Cl.
*B33Y 10/00* (2015.01)
*B22F 1/052* (2022.01)
(Continued)

(52) U.S. Cl.
CPC ............ *B29C 64/165* (2017.08); *B22F 1/052* (2022.01); *B22F 1/107* (2022.01); *B22F 3/24* (2013.01);
(Continued)

(58) Field of Classification Search
CPC ....... B22F 10/14; B29C 64/165; B33Y 10/00; B33Y 70/00; B33Y 70/10; C08G 18/3885;
(Continued)

(56) References Cited

U.S. PATENT DOCUMENTS

| 5,401,695 A | 3/1995 | Wu |
| 6,313,257 B1 * | 11/2001 | Abbey ................ C08G 59/66 528/109 |

(Continued)

FOREIGN PATENT DOCUMENTS

| CN | 1730551 A | 2/2006 |
| CN | 107008908 A | 8/2017 |

(Continued)

OTHER PUBLICATIONS

Wapner et al., Structure and stability of adhesion promoting aminopropyl phosphonate layers at polymer/aluminium oxide interfaces, International Journal of Adhesion & Adhesives 28, 2007, pp. 59-70.

(Continued)

*Primary Examiner* — Vanessa T. Luk

(74) *Attorney, Agent, or Firm* — HP Inc. Patent Department

(57) ABSTRACT

A three-dimensional printing kit can include a particulate build material including from about 80 wt % to about 100 wt % metal particles, a binder fluid including water and latex particles in an amount of from about 5 wt % to about 30 wt % based on a total weight of the binder fluid, and an amine-bearing phosphonic adhesion promoter included in the binder fluid in an amount of from about 0.05 wt % to about 3.5 wt % based on a total amount of the binder fluid, or a separate adhesion promoter fluid in an amount of from about 0.1 wt % to about 5 wt % based on a total amount of the adhesion promoter fluid.

14 Claims, 4 Drawing Sheets

(51) Int. Cl.
  *B22F 1/107* (2022.01)
  *B22F 3/24* (2006.01)
  *B22F 10/14* (2021.01)
  *B29C 64/165* (2017.01)
  *B33Y 40/20* (2020.01)
  *B33Y 70/10* (2020.01)

(52) U.S. Cl.
  CPC ............... *B33Y 10/00* (2014.12); *B33Y 40/20* (2020.01); *B33Y 70/10* (2020.01); *B22F 2003/248* (2013.01); *B22F 10/14* (2021.01); *B22F 2304/10* (2013.01)

(58) Field of Classification Search
  CPC .. C08G 18/5084; C08G 59/56; C08K 5/5317; C08K 5/5333; C08K 5/5337; C08K 5/5353; C08K 5/5357; C08K 5/5373; C08K 5/521; C08K 5/523; C08K 5/529; C08K 2003/0321; C08K 2003/322; C08K 2003/323; C08K 2003/324; C08K 2003/325; C08K 2003/326; C08K 2003/327; C08K 2003/328; C07H 11/04; C07H 13/00; C07H 19/10; C07H 19/11; C07H 19/20; C07H 19/207; C07H 19/213
  See application file for complete search history.

(56) References Cited

U.S. PATENT DOCUMENTS

| | | |
|---|---|---|
| 2004/0094058 A1 | 5/2004 | Kasperchik et al. |
| 2006/0208388 A1 | 9/2006 | Bredt et al. |
| 2014/0322501 A1* | 10/2014 | Ederer ..................... B28B 1/16 428/206 |
| 2015/0080495 A1 | 3/2015 | Heikkila |
| 2016/0029483 A1 | 1/2016 | Kawato et al. |
| 2016/0137839 A1* | 5/2016 | Rolland ................. C08G 18/42 522/71 |
| 2016/0272844 A1* | 9/2016 | Osaka ..................... B22F 1/102 |

FOREIGN PATENT DOCUMENTS

| | | |
|---|---|---|
| EP | 2001656 B1 | 10/2014 |
| WO | 0100698 | 1/2001 |
| WO | WO-2013173319 A1 | 11/2013 |
| WO | 2018156938 | 8/2018 |

OTHER PUBLICATIONS

Hotchkiss, Peter J., The design synthesis and use of phosphonic acids for . . . , Nov. 11, 2008, Georgia Tech Theses and Dissertations.
Mondin, Giovanni, Functionalization of particles and selective functionalization . . . , Nov. 28, 2014, Technical University Dresden.
Striewe, Jan et al., Design and testing of co-cured bonded CFRP-steel hybrids . . . , Jun. 24, 2018, ECCM18—18th European Conference . . . .

* cited by examiner

THREE-DIMENSIONAL PRINTING

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of build material. This is unlike other machining processes, which often rely upon the removal of material to create the final part. Some 3D printing methods use chemical binders or adhesives to bind build materials together. Other 3D printing methods involve at least partial sintering, melting, etc., of the build material. For some 3D printing methods, at least partial melting of build material may be accomplished using heat-assisted extrusion, and for some other materials (e.g., polymerizable materials), curing may be accomplished using, for example, ultra-violet light or infrared light.

DETAILED DESCRIPTION

Figure 1A:
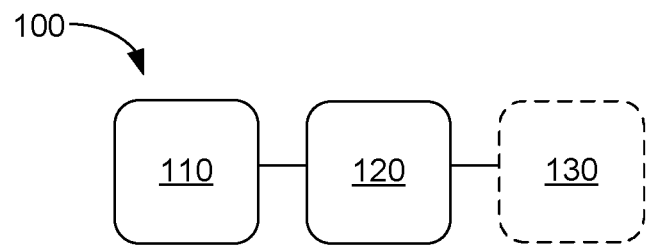
FIG. 1A schematically illustrates example three-dimensional printing kits in accordance with the present disclosure.

An example 3-dimensional (3D) printing process can be an additive process that can involve the application of successive layers of build material with chemical binders or adhesives printed thereon to bind the successive layers of build materials together. In some processes, thermal processing, melting, sintering, or the like can be utilized to form a green body object and then a fused metal three-dimensional physical object. More specifically, a binder fluid can be selectively applied to a layer of particulate build material on a build platform to pattern a selected region of the layer and then another layer of the particulate build material is applied thereon. The binder fluid can be applied to another layer of the particulate build material and these processes can be repeated to form a green part (also referred to as a green body) of the 3D printed object that is ultimately formed. The binder fluid can be capable of penetrating the layer of the particulate build material onto which it is applied, and/or spreading around an exterior surface of the particulate build material and filling void spaces between particles of the particulate build material. The binder fluid can include a binder particle, such as latex, that can hold the particulate build material of the green body or part together. The green body can then be exposed to heat to fuse, e.g., sinter, anneal, melt, or the like, the particulate build material of the green part together and form a fused 3D printed object.

In some 3D printing methods, once the green body is formed and solidified sufficiently, it can often be moved to a separate device for heating at higher temperatures, such as an oven suitable for fusing, e.g., sintering, annealing, melting, etc., the metal particles together, thereby turning the 3D green body into a fused 3D solid part that is much more rigid. However, to move the green body to the oven, though the green body does not need to be highly stable or rigid, it can be useful for the green body to be stable or rigid enough to make the journey from the protection and support the green body may enjoy within the particulate build material where it was formed to the oven where it will ultimately be fused, e.g., sintered, annealed, melted, etc. Thus, tensile strength of the green body part can play a role in the robustness of the green body prior to fusing.

In accordance with this, in one example, a three-dimensional printing kit can include a particulate build material including from about 80 wt % to about 100 wt % metal particles, a binder fluid including water and latex particles in an amount of from about 5 wt % to about 30 wt % based on a total weight of the binder fluid, and an amine-bearing phosphonic adhesion promoter included in the binder fluid in an amount of from about 0.05 wt % to about 3.5 wt % based on the total amount of the binder fluid, or a separate adhesion promoter fluid in an amount of from about 0.1 wt % to about 5 wt % based on the total amount of the adhesion promoter fluid. In some examples, the metal particles have a D50 particle size distribution value of from about 4 μm to about 150 μm. In some further examples, the metal particles can be aluminum, titanium, copper, cobalt, chromium, nickel, vanadium, tungsten, tungsten carbide, tantalum, molybdenum, magnesium, gold, silver, stainless steel, steel, and alloy thereof, or an admixture thereof. In additional examples, the amine-bearing phosphonic adhesion promoter can be included in the binder fluid. In other examples, the amine-bearing phosphonic adhesion promoter has the general formula:

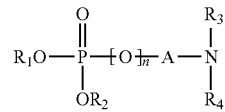

$R_1$ and $R_2$ are independently selected from hydrogen, linear or branched $C_1$-$C_5$ alkyl, or linear or branched $C_1$-$C_5$ alkyl amine;

A is linear or branched $C_1$-$C_{12}$ alkyl, or nitrogen-substituted linear or branched $C_2$-$C_{12}$ alkyl;

n is 0 or 1; and $R_3$ and $R_4$ are independently hydrogen, $NH_2$, linear or branched $C_1$-$C_{10}$ alkyl, nitrogen-substituted linear or branched $C_1$-$C_{10}$ alkyl, linear or branched $C_1$-$C_{10}$ alkyl phosphonic acid, nitrogen-substituted linear or branched $C_1$-$C_{10}$ alkyl phosphonic acid, or linear or branched $C_1$-$C_5$ alkyl halide, or wherein $R_3$ and $R_4$ are joined to form a ring structure. In still additional examples, the amine-bearing phosphonic adhesion promotor can include aminomethyl phosphonic acid, 1-aminoethyl phosphonic acid, 2-aminoethyl phosphonic acid, 1-aminopropyl phosphonic acid, 2-aminopropyl phosphonic acid, 3-aminopropyl phosphonic acid, 1-aminobutyl phosphonic acid, 2-aminobutyl phosphonic acid, 4-aminobutyl phosphonic acid, 1-aminopentyl phosphonic acid, 5-aminopentyl phosphonic acid, 1-aminohexyl phosphonic acid, 6-aminohexyl phosphonic acid, or a combination thereof.

In some other examples, a multi-fluid kit for three-dimensional printing can include a binder fluid including water and latex particles in an amount of from about 5 wt % to about 30 wt % and an adhesion promoter fluid including water and an amine-bearing phosphonic adhesion promoter in an amount of from about 0.1 wt % to about 5 wt %. In some examples, the latex particles include a styrene (meth) acrylate copolymer. In some additional examples, one or both of the binder fluid or the adhesion promoter fluid independently include organic co-solvent in an amount of from about 0.5 wt % to about 50 wt %. In still additional examples, the amine-bearing phosphonic adhesion promoter has the general formula:

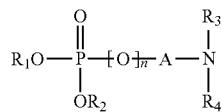

where
$R_1$ and $R_2$ are independently selected from hydrogen, linear or branched $C_1$-$C_5$ alkyl, or linear or branched $C_1$-$C_5$ alkyl amine;
A is linear or branched $C_1$-$C_{12}$ alkyl, or nitrogen-substituted linear or branched $C_2$-$C_{12}$ alkyl;
n is 0 or 1; and
$R_3$ and $R_4$ are independently hydrogen, $NH_2$, linear or branched $C_1$-$C_{10}$ alkyl, nitrogen-substituted linear or branched $C_1$-$C_{10}$ alkyl, linear or branched $C_1$-$C_{10}$ alkyl phosphonic acid, nitrogen-substituted linear or branched $C_1$-$C_{10}$ alkyl phosphonic acid, or linear or branched $C_1$-$C_5$ alkyl halide, or wherein $R_3$ and $R_4$ are joined to form a ring structure.

In some other examples, a method of three-dimensional printing can include iteratively applying individual build material layers of a particulate build material which includes from about 80 wt % to about 100 wt % metal particles, and based on the 3D object model, selectively applying water, latex particles, and an amine-bearing phosphonic adhesion promoter to individual build material layers to define individually patterned layers of a 3D green body object and heating the individually patterned layers to drive off water and further solidify the 3D green body object. In some examples, the latex particles are selectively applied by ejecting a binder fluid including water and the latex particles in an amount of from about 5 wt % to about 30 wt %, and the amine-bearing phosphonic adhesion promoter is selectively applied by ejecting an adhesion promoter fluid including water and the amine-bearing phosphonic adhesion promoter in an amount of about 0.1 wt % to about 5 wt % as a separate fluid. In some other examples, the latex particles and the amine-bearing phosphonic adhesion promoter are selectively applied by ejecting a binder fluid including water, the latex particles in an amount of from about 5 wt % to about 30 wt %, and the amine-bearing phosphonic adhesion promoter in an amount of about 0.05 wt % to about 3.5 wt %. In some specific examples, heating occurs at from about 100° C. to about 250° C. for about 5 minutes to about 2 hours. In still other examples, the method further includes separating the 3D green body object from the particulate build material and sintering the metal particles of the 3D green body object in an annealing oven.

It is noted that when discussing the three-dimensional printing kits, the multi-fluid kits, and methods of three-dimensional printing herein, these discussions can be considered applicable to one another whether or not they are explicitly discussed in the context of that example. Thus, for example, when discussing a binder fluid related to a three-dimensional printing kits, such disclosure is also relevant to and directly supported in the context of multi-fluid kits, methods of three-dimensional printing, vice versa, etc.

It is also understood that terms used herein will take on their ordinary meaning in the relevant technical field unless specified otherwise. In some instances, there are terms defined more specifically throughout the specification or included at the end of the present specification, and thus, these terms have a meaning as described herein.

Particulate Build Materials

In examples of the 3D printing kits and methods disclosed herein, the build material can include any particulate build material that includes from about 80 wt % to about 100 wt % metal particles based on the total weight of the particulate build material. In other examples, the metal particles can be present in the particulate build material at from about 90 wt % to about 100 wt %, from about 95 wt % to about 100 wt %, or at about 100 wt %. In an example, the build material particles are a single phase metallic material composed of one element. In this example, the fusing temperature may be below the melting point of the single element. In another example, the build material particles are composed of two or more elements, which may be in the form of a single phase metallic alloy or a multiple phase metallic alloy. In these other examples, fusing generally occurs over a range of temperatures. With respect to alloys, materials with a metal alloyed to a non-metal (such as a metal-metalloid alloy) can be used as well.

In some examples, the particulate build material can include particles of aluminum, titanium, copper, cobalt, chromium, nickel, vanadium, tungsten, tungsten carbide, tantalum, molybdenum, magnesium, gold, silver, ferrous alloy, stainless steel, steel, alloys thereof, or admixtures thereof. Specific alloy examples can include AlSi 10 Mg, 2xxx series aluminum, 4xxx series aluminum, CoCr MP1, CoCr SP2, maraging steel MS1, hastelloy C, hastelloy X, nickel alloy HX, inconel IN625, inconel IN718, stainless steel GP1, stainless steel 17-4PH, stainless steel 316L, stainless steel 430L titanium 6Al4V, and titanium 6Al-4V ELI7.

The temperature(s) at which the metallic particles of the particulate build material fuse together is/are above the temperature of the environment in which the patterning portion of the 3D printing method is performed, e.g., patterning at from about 18° C. to about 300° C. and fusing at from about 500° C. to about 3,500° C. In some examples, the metallic build material particles may have a melting point ranging from about 500° C. to about 3,500° C. In other examples, the metallic build material particles may be an alloy having a range of melting points.

The particle size of the particulate build material can be similarly sized or differently sized. In one example, the D50 particle size of the particulate build material can range from 0.5 μm to 200 μm. In some examples, the particles can have a D50 particle size distribution value that can range from about 1 μm to about 150 μm, from about 1 μm to about 100 μm, from about 1 μm to about 50 μm, from about 4 μm to about 150 μm, from about 4 μm to about 100 μm, from about 4 μm to about 50 μm, etc. Individual particle sizes can be outside of these ranges, as the "D50 particle size" is defined as the particle size at which about half of the particles are larger than the D50 particle size and about half of the other particles are smaller than the D50 particle size (by weight based on the metal particle content of the particulate build material). As used herein, particle size refers to the value of the diameter of spherical particles or in particles that are not spherical can refer to the longest dimension of that particle. The shape of the particles of the particulate build material can be spherical, non-spherical, random shapes, or a combination thereof. The particle size can be presented as a Gaussian distribution or a Gaussian-like distribution (or normal or normal-like distribution). Gaussian-like distributions are distribution curves that may appear Gaussian in their distribution curve shape, but which can be slightly skewed in one direction or the other (toward the smaller end or toward the larger end of the particle size distribution range). That being stated, an example Gaussian-like distribution of the metal particles can be characterized generally using "D10," "D50," and "D90" particle size distribution values, where D10 refers to the particle size at the 10th percentile, D50 refers to the particle size at the 50th percentile, and D90 refers to the particle size at the 90th percentile. For example, a D50 value of 25 μm means that 50% of the particles (by number) have a particle size greater than 25 μm and 50% of the particles have a particle size less than 25 μm. Particle size distribution values may not be related to Gaussian distribution curves, but in one example of the present disclosure, the metal particles can have a Gaussian distribution, or more typically a Gaussian-like distribution with offset peaks at about D50. In practice, true Gaussian distributions are not typically present, as some skewing can be present, but still, the Gaussian-like distribution can be considered to be referred to as "Gaussian" as typically used.

Amine-Bearing Phosphonic Adhesion Promoter

To bind the particulate build material on a layer by layer basis and form a 3D green body object, binder fluid with latex particles can be used. In some examples herein, the tensile strength of the green body formed using the particulate build material and the latex particles can be enhanced using an amine-bearing phosphonic adhesion promoter.

In particular, amine-bearing phosphonic adhesion promoters have been found to be effective in interacting or otherwise providing adhesion promotion between the latex particles and particulate build material. Thus, in many instances, the inclusion of an amine-bearing phosphonic adhesion promoter applied to layers of particulate build material along with latex particles can enhance the tensile strength of a 3D green body object. This is particularly useful when the green body, once formed through an additive layer by layer printing process, is to be moved after preparation into an oven for fusing, e.g., sintering, annealing, melting, etc. Without sufficient tensile strength, 3D green body objects can become damaged during the move from the (non-solidified) particulate build material to the fusing oven, particularly if the part is large or complex.

It is noted that while phosphonic acid is generally referred to herein for the sake of brevity and clarity, the term "phosphonic" with respect to the amine-bearing phosphonic adhesion promoter is to be understood as referring to adhesion promoters that include but an amine moiety and a phosphonic acid or phosphonate moiety. Thus, the term "phosphonic" includes phosphonic acid moieties (e.g., —PO(OH)$_2$) and phosphonate moieties (e.g., —PO(OH)(OR) or —PO(OR)$_2$). This term, however, is also inclusive of phosphoric acid moieties (e.g., —O—PO(OH)$_2$) and phosphate moieties (e.g., —O—PO(OH)(OR) or —O—PO(OR)$_2$) because they include the phosphonic acid and phosphonate moieties with an additional oxygen atom. With specific phosphonates and phosphates, the "R" is representative of a salt, alkyl, aryl, ester or other group replacing one or more hydrogen of the corresponding acid, for example. With this in mind, in some examples, the amine-bearing phosphonic adhesion promoter can include a single phosphonic acid moiety. In some other examples, the amine-bearing phosphonic adhesion promoter can include a plurality of phosphonic acid moieties. Where a plurality of phosphonic acid moieties are included in the amine-bearing phosphonic adhesion promoter, individual phosphonic acid moieties can include the same type of phosphonic acid moieties or different types of phosphonic acid moieties.

An amine can be attached to the phosphonic acid moiety in a variety of ways. In some examples, the amine can be amino. In some other examples, the amine can be a secondary amine. In yet other examples, the amine can be a tertiary amine. In some further examples, the amine-bearing phosphonic adhesion promoter can include a plurality of amine moieties. Where this is the case, the plurality of amine moieties can be amino, secondary amines, tertiary amines, or a combination thereof.

In some specific examples, the amine-bearing phosphonic adhesion promoter can have the general formula:

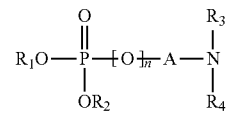

where:
R$_1$ and R$_2$ are independently selected from hydrogen, linear or branched C$_1$-C$_5$ alkyl, or linear or branched C$_1$-C$_5$ alkyl amine;
A is linear or branched C$_1$-C$_{12}$ alkyl, or nitrogen-substituted linear or branched C$_2$-C$_{12}$ alkyl;
n is 0 or 1; and
R$_3$ and R$_4$ are independently hydrogen, NH$_2$, linear or branched C$_1$-C$_{10}$ alkyl, nitrogen-substituted linear or branched C$_1$-C$_{10}$ alkyl, linear or branched C$_1$-C$_{10}$ alkyl phosphonic acid, nitrogen-substituted linear or branched C$_1$-C$_{10}$ alkyl phosphonic acid, or linear or branched C$_1$-C$_5$ alkyl halide, or wherein R$_3$ and R$_4$ are joined to form a ring structure.

In further detail, R$_1$ and R$_2$ can include a variety of substituents. In some specific examples, R$_1$ and R$_2$ can both be hydrogen. In some other examples, R$_1$ or R$_2$ can be hydrogen. In some additional examples, R$_1$ and R$_2$ can be substituents other than hydrogen. For example, in some cases, R$_1$, R$_2$, or both can be selected from linear or branched C$_1$-C$_5$ alkyl, such as methyl, ethyl, propyl, butyl, and pentyl, including all suitable isomers thereof. In some further examples, R$_1$, R$_2$, or both can be selected from linear or branched C$_1$-C$_3$ or C$_1$-C$_2$ alkyl. In some additional examples, R$_1$, R$_2$, or both can be selected from linear or branched C$_1$-C$_5$ alkyl amine, such as methylamine, ethyl-amine, propylamine, butylamine, and pentylamine, including all suitable isomers thereof. In some further examples, $R_1$, $R_2$, or both can be selected from linear or branched $C_1$-$C_3$ or $C_1$-$C_2$ alkyl amine.

Additionally, A can represent a variety of linking groups. In some specific examples, A can include a linear or branched $C_1$-$C_{12}$, $C_1$-$C_6$, or $C_1$-$C_4$ alkyl substituent. In some specific examples, A can include a linear alkyl substituent, such as methyl, ethyl, propyl, butyl, pentyl, hexyl, heptyl, octyl, nonyl, decyl, undecyl, or dodecyl. Where this is the case, the amine group can be a terminal amine group. In other examples, A can include a branched $C_2$-$C_{12}$, $C_1$-$C_6$, or $C_1$-$C_4$ alkyl substituent, including all suitable branched isomers of ethyl, propyl, butyl, pentyl, hexyl, heptyl, octyl, nonyl, decyl, undecyl, or dodecyl. Where this is the case, the amine group can be positioned at a variety of locations along the branched chain. In some examples, the amine group can be positioned at a terminus of one of the branches of the branched alkyl substituent. In some further examples, the amine group can be co-pendant from a common carbon atom with a branched portion of the alkyl chain, such as in the following structure where A is a branched $C_2$ alkyl group, for example:

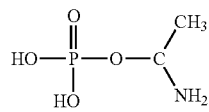

In additional examples, A can be a substituted linear or branched $C_1$-$C_{12}$, $C_1$-$C_6$, or $C_1$-$C_4$ alkyl substituent. Where this is the case, the same general structures described with respect to the non-substituted linking group A can also apply here. However, a carbon atom from the linear or branched alkyl substituent can be substituted with a heteroatom. A variety of suitable heteroatoms can be employed. Non-limiting examples can include nitrogen, oxygen, sulfur, phosphorus, a halide (e.g. chlorine, bromine, iodine, etc.), the like, or a combination thereof. In some specific examples, the heteroatom can include nitrogen. In some examples, a single heteroatom can be substituted along the linear or branched alkyl substituent. In other examples, a plurality of heteroatoms can be substituted along the linear or branched alkyl substituent.

$R_3$ and $R_4$ can also include a variety of substituents. In some examples, $R_3$ and $R_4$ can both be hydrogen. In additional examples, $R_3$ or $R_4$ can be hydrogen. In some additional examples, $R_3$ and $R_4$ can be a substituent other than hydrogen. In some other examples, $R_3$ can be $NH_2$. In yet additional examples, $R_4$ can be $NH_2$. In still additional examples, $R_3$ and $R_4$ can be joined or connect to form a ring structure, such as an aziridine, an azetidine, a pyrrolidine, a piperidine, etc.

In some examples, $R_3$, $R_4$, or both can include a linear or branched $C_1$-$C_{10}$ alkyl group. In some examples, $R_3$, $R_4$, or both can include a linear or branched $C_1$-$C_6$ or $C_1$-$C_4$ alkyl group. In still additional examples, $R_3$, $R_4$, or both can include a substituted linear or branched $C_1$-$C_{10}$, $C_1$-$C_6$, or $C_1$-$C_4$ alkyl group. Where this is the case, a carbon atom of the substituted linear or branched alkyl group can be replaced by a heteroatom or other substituted moiety. Non-limiting examples of heteroatoms and other substituted moieties can include nitrogen, oxygen, sulfur, phosphorus, a halide (e.g. chlorine, bromine, iodine, etc.), a phosphonic acid moiety, the like, or a combination thereof. In some specific examples, the substituted moiety can include nitrogen. Thus, in some examples, the substituted linear or branched $C_1$-$C_{10}$, $C_1$-$C_6$, or $C_1$-$C_4$ alkyl group can be a nitrogen-substituted linear or branched $C_1$-$C_{10}$, $C_1$-$C_6$, or $C_1$-$C_4$ alkyl group. In some other specific examples, the substituted moiety can include a halide. In yet additional specific examples, the substituted moiety can include a phosphonic acid moiety. In some examples, a single substitution can be made on the substituted linear or branched alkyl group. In some other examples, a plurality of substitutions can be made on the substituted linear or branched alkyl group.

In some further examples, $R_3$, $R_4$, or both can include a linear or branched $C_1$-$C_{10}$ alkyl phosphonic acid. In some examples, the linear or branched $C_1$-$C_{10}$ alkyl phosphonic acid can include a single phosphonic acid moiety. In other examples, such as where the alkyl chain is branched, the $C_1$-$C_{10}$ alkyl phosphonic acid can include a plurality of phosphonic acid groups. In some further examples, the linear or branched $C_1$-$C_{10}$ alkyl phosphonic acid can be substituted. Where this is the case, the linear or branched $C_1$-$C_{10}$ alkyl phosphonic acid can be substituted with a variety of heteroatoms. Non-limiting examples can include nitrogen, oxygen, sulfur, phosphorus, a halide (e.g. chlorine, bromine, iodine, etc.), the like, or a combination thereof. In some specific examples, the heteroatom can include nitrogen. Thus, in some examples, the linear or branched $C_1$-$C_{10}$ alkyl phosphonic acid can be a nitrogen-substituted linear or branched $C_1$-$C_{10}$ alkyl phosphonic acid. In some examples, the linear or branched $C_1$-$C_{10}$ alkyl phosphonic acid can include a single substituted heteroatom. In other examples, the linear or branched $C_1$-$C_{10}$ alkyl phosphonic acid can include a plurality of substituted heteroatoms.

In some further examples, $R_3$, $R_4$, or both can include a linear or branched $C_1$-$C_5$ alkyl halide (e.g. chlorine, bromine, iodine, etc.). In some examples, the linear or branched $C_1$-$C_5$ alkyl halide can include a single halide moiety. In other examples, such as where the alkyl chain is branched, the $C_1$-$C_5$ alkyl halide can include a plurality of halide groups. In some further examples, the linear or branched $C_1$-$C_5$ alkyl halide can be substituted. Where this is the case, the linear or branched $C_1$-$C_5$ alkyl halide can be substituted with a variety of heteroatoms. Non-limiting examples can include nitrogen, oxygen, sulfur, phosphorus, the like, or a combination thereof. In some specific examples, the heteroatom can include nitrogen. Thus, in some examples, the linear or branched $C_1$-$C_5$ alkyl halide can be a nitrogen-substituted linear or branched $C_1$-$C_5$ alkyl halide. In some examples, the linear or branched $C_1$-$C_5$ alkyl halide can include a single substituted heteroatom. In other examples, the linear or branched $C_1$-$C_5$ alkyl halide can include a plurality of substituted heteroatoms.

A few non-limiting examples of amine-bearing phosphonic adhesion promoters are shown in Table 1, as follows:

Table 1-Amine-Bearing Phosphonic Adhesion Promoters

| TABLE 1 |
|---|
| Amine-Bearing Phosphonic Adhesion Promoters |

| | |
|---|---|
| Aminomethyl Phosphonic Acid | 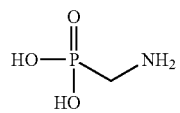 |
| 2-Aminoethyl Phosphonic Acid | 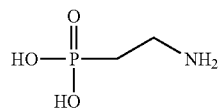 |
| 3-Aminopropyl Phosphonic Acid | 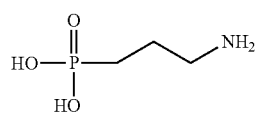 |
| 3-Aminopropyl Dihydrogen Phosphate | 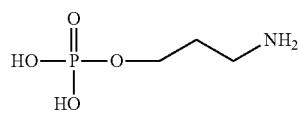 |
| Di-(3-Aminopropyl) Monohydrogen Phosphate | 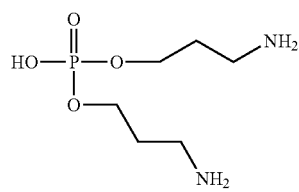 |
| 4-Aminobutyl Dihydrogen Phosphate | 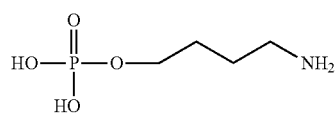 |
| Di-(4-Aminobutyl) Monohydrogen Phosphate | 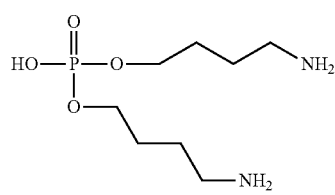 |
| Diethyl (4-Aminobutyl) Phosphonate | 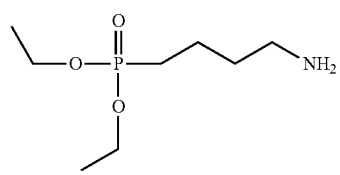 |
| 2-Methyl-3-Aminopropyl Dihydrogen Phosphate | 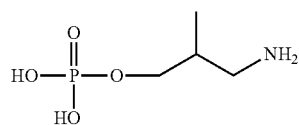 |
| 5-Aminopentyl Phosphonic Acid | 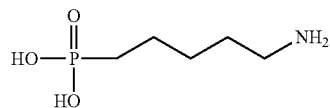 |

TABLE 1-continued

Amine-Bearing Phosphonic Adhesion Promoters

| Name | Structure |
|---|---|
| 5-Aminopentyl Dihydrogen Phosphate | 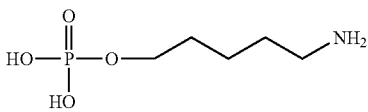 [SMILES: NCCCCCOP(=O)(O)O] |
| 6-Aminohexyl Phosphonic Acid | 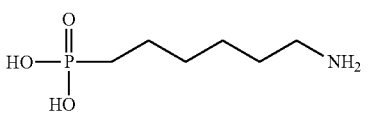 [SMILES: NCCCCCCP(=O)(O)O] |
| Di-(5-Aminopentyl) Monohydrogen Phosphate | 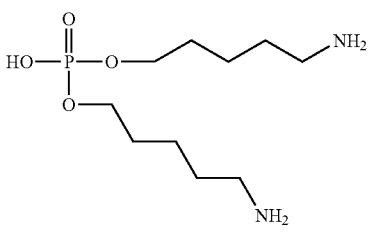 |
| 1-Aminoethyl Phosphonic Acid | 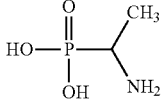 |
| Diethyl (1-Aminoethyl) Phosphonate | 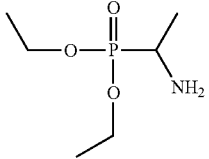 |
| 1-Aminopropyl Phosphonic Acid | 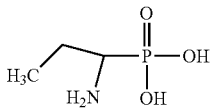 |
| (1R)-(+)-(1-Amino-2-Methylpropyl) Phosphonic Acid | 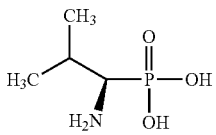 |
| Hydrazinylmethyl Phosphonic Acid | 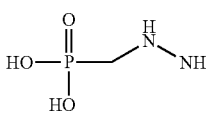 |
| [2-(2-Propylamino)] Ethyl Phosphonic Acid | 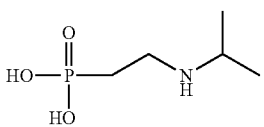 |
| Ethylene Diamine Tetra (Methylene Phosphonic Acid) | 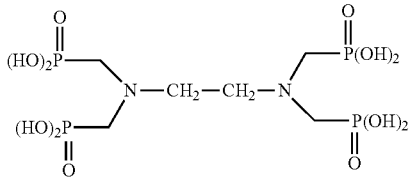 |
| [5-[[2-[(2-Aminoethyl)Amino]Ethyl] Amino]Pentyl] Phosphonic Acid | 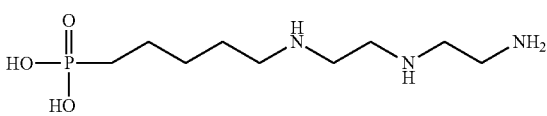 [SMILES: NCCNCCNCCCCCP(=O)(O)O] |

TABLE 1-continued

Amine-Bearing Phosphonic Adhesion Promoters (3-((2-Aziridin-1-yl)Ethyl)
Amino) Propyl) Phosphonic Acid

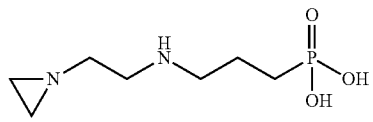 [SMILES: O=P(O)(O)CCCNCCN1CC1]

3-[2-(2-Chloroethylamino)Ethylamino)
Propyl Dihydrogen Phosphate Dihydrochloride

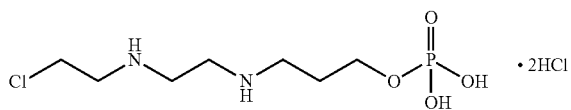 [SMILES: O=P(O)(O)OCCCNCCNCCCl]

[3-(Dimethylamino)Propyl-
(Phosphonomethyl)Amino] Methylphosphonic
Acid; Hydrochloride            HCl

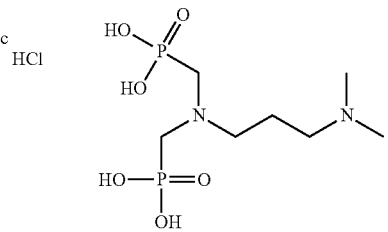

It is noted that many of structures presented in Table 1 are shown in acid form for the sake of brevity. However, this is not intended to be limiting. For example, the structures in Table 1 can also be in salt form, ester form, or can include alkyl or aryl groups (e.g. $C_1$-$C_5$ alkyl or aryl groups, for example) substituted on the phosphonic or phosphoric acid moiety.

In some specific examples, the amine-bearing phosphonic adhesion promotor can include aminomethyl phosphonic acid, 1-aminoethyl phosphonic acid, 2-aminoethyl phosphonic acid, 1-aminopropyl phosphonic acid, 2-aminopropyl phosphonic acid, 3-aminopropyl phosphonic acid, 1-aminobutyl phosphonic acid, 2-aminobutyl phosphonic acid, 4-aminobutyl phosphonic acid, 1-aminopentyl phosphonic acid, 5-aminopentyl phosphonic acid, 1-aminohexyl phosphonic acid, 6-aminohexyl phosphonic acid, the like, or a combination thereof.

Latex Particles

To bind the particulate build material together during the build process to form a 3D green body object, binder fluid can be applied to the particulate build material on a layer by layer basis. Heat (below metal sintering temperatures) can be applied on a layer by layer basis, upon formation of a plurality of layers of the green body, or in some cases, after the green body is fully formed. The binder fluid can include latex particles as a binding agent and an aqueous liquid vehicle. In some examples, the binder fluid can also include an amine-bearing phosphonic adhesion promoter. If the amine-bearing phosphonic adhesion promoter is not present in the binder fluid, then there can be a separate adhesion promoter fluid present that contains the amine-bearing phosphonic adhesion promoter. Thus, description related to the amine-bearing phosphonic adhesion promoter is relevant to the binder fluid when the amine-bearing phosphonic adhesion promoter is included in a common aqueous liquid vehicle with the latex particles.

Referring now specifically to the latex particles that can be used in a binder fluid to pattern build material to form a 3D green body object, and ultimately a fused 3D object, the latex particles can be present based on a total weight of the binder fluid at from about 5 wt % to about 30 wt %, from about 10 wt % to about 25 wt %, from about 12 wt % to about 22 wt %, from about 15 wt % to about 20 wt %, from about 10 wt % to about 20 wt %, or from about 6 wt % to about 18 wt %.

The latex particles can be a polymer that can have different morphologies. In one example, the latex particles can include two different copolymer compositions, which may be fully separated core-shell polymers, partially occluded mixtures, or intimately comingled as a polymer solution. In another example, the latex particles can be individual spherical particles containing polymer compositions of hydrophilic (hard) component(s) and/or hydrophobic (soft) component(s) that can be interdispersed. In one example, the interdispersion can be according to IPN (interpenetrating networks). In yet another example, the latex particles can be composed of a hydrophobic core surrounded by a continuous or discontinuous hydrophilic shell. For example, the particle morphology can resemble a raspberry, in which a hydrophobic core can be surrounded by several smaller hydrophilic particles that can be attached to the core. In yet another example, the latex particles can include 2, 3, or 4 or more relatively large polymer particles that can be attached to one another or can surround a smaller polymer core. In a further example, the latex particles can have a single phase morphology that can be partially occluded, can be multiple-lobed, or can include any combination of any of the morphologies disclosed herein.

In some examples, the latex particles can be heteropolymers or copolymers. As used herein, a heteropolymer can include a hydrophobic component and a hydrophilic component. A heteropolymer can include a hydrophobic component that can include from about 65% to about 99.9% (by weight of the heteropolymer), and a hydrophilic component that can include from about 0.1% to about 35% (by weight of the heteropolymer). In one example, the hydrophobic component can have a lower glass transition temperature than the hydrophilic component.

In some examples, the latex particles can be composed of a polymerization or co-polymerization of acrylic monomers, styrene monomers, or a combination thereof. Example monomers can include, C1-C20 linear or branched alkyl (meth)acrylate, alicyclic (meth)acrylate, alkyl acrylate, styrene, methyl styrene, polyol (meth)acrylate, hydroxyethyl (meth)acrylate, (meth)acrylic acid, or a combination thereof. In one specific class of examples, the latex particles can be a styrene (meth)acrylate copolymer. The term "(meth)acrylate" or "(meth)acrylic acid" or the like refers to monomers, copolymerized monomers, etc., that can either be acrylate or methacrylate (or a combination of both), or acrylic acid or methacrylic acid (or a combination of both). In some examples, the terms "(meth)acrylate" and "(meth)acrylic acid" can be used interchangeably, as acrylates and methacrylates are salts and esters of acrylic acid and methacrylic acid, respectively. Furthermore, mention of one compound over another can be a function of pH. Furthermore, even if the monomer used to form the polymer was in the form of a (meth)acrylic acid during preparation, pH modifications during preparation or subsequently when added to an ejectable fluid, such as a binder fluid, can impact the nature of the moiety as well (acid form vs. salt or ester form). Thus, a monomer or a moiety of a polymer described as (meth) acrylic acid or as (meth)acrylate should not be read so rigidly as to not consider relative pH levels, ester chemistry, and other general organic chemistry concepts. In still another example, the latex particles can include a copolymer with copolymerized methyl methacrylate being present at about 50 wt % or greater, or copolymerized styrene being present at about 50 wt % or greater. Both can be present, with one or the other at about 50 wt % or greater in a more specific example.

In other examples, the latex particles in the binder fluid include polymerized monomers of vinyl, vinyl chloride, vinylidene chloride, vinyl ester, acrylate, methacrylate, styrene, ethylene, maleate esters, fumarate esters, itaconate esters, α-methyl styrene, p-methyl styrene, methyl methacrylate, hexyl acrylate, hexyl methacrylate, butyl acrylate, butyl methacrylate, ethyl acrylate, ethyl methacrylate, propyl acrylate, propyl methacrylate, 2-ethylhexyl acrylate, 2-ethylhexyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, benzyl methacrylate, benzyl acrylate, ethoxylated nonyl phenol methacrylate, isobornyl methacrylate, cyclohexyl methacrylate, trimethyl cyclohexyl methacrylate, t-butyl methacrylate, n-octyl methacrylate, lauryl methacrylate, trydecyl methacrylate, alkoxylated tetrahydrofurfuryl acrylate, isodecyl acrylate, isobornylmethacrylate, isobornyl acrylate, dimethyl maleate, dioctyl maleate, acetoacetoxyethyl methacrylate, diacetone acrylamide, N-vinyl imidazole, N-vinylcarbazole, N-Vinyl-caprolactam, combinations thereof, derivatives thereof, or mixtures thereof. These monomers include low glass transition temperature (Tg) monomers that can be used to form the hydrophobic component of a heteropolymer.

In other examples, a composition of the latex particles can include acidic monomers. In some examples, the acidic monomer content can range from 0.1 wt % to 15 wt %, from 0.5 wt % to 12 wt %, or from 1 wt % to 10 wt % of the latex particles with the remainder of the latex particle being composed of non-acidic monomers. Example acidic monomers can include acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy) propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, combinations thereof, derivatives thereof, or mixtures thereof. These acidic monomers are higher Tg hydrophilic monomers, than the low Tg monomers above, and can be used to form the hydrophilic component of a heteropolymer. Other examples of high Tg hydrophilic monomers can include acrylamide, methacrylamide, monohydroxylated monomers, monoethoxylated monomers, polyhydroxylated monomers, or polyethoxylated monomers.

In an example, the selected monomer(s) can be polymerized to form a polymer, heteropolymer, or copolymer with a co-polymerizable dispersing agent. The co-polymerizable dispersing agent can be a polyoxyethylene compound, such as a HITENOL® compound (Montello Inc.) e.g., polyoxyethylene alkylphenyl ether ammonium sulfate, sodium polyoxyethylene alkylether sulfuric ester, polyoxyethylene styrenated phenyl ether ammonium sulfate, or mixtures thereof. Any suitable polymerization process can be used. In some examples, an aqueous dispersion of latex particles can be produced by emulsion polymerization or co-polymerization of any of the above monomers.

In one example, the latex particles can be prepared by polymerizing high Tg hydrophilic monomers to form the high Tg hydrophilic component and attaching the high Tg hydrophilic component onto the surface of the low Tg hydrophobic component. In another example, the latex particles can be prepared by polymerizing the low Tg hydrophobic monomers and the high Tg hydrophilic monomers at a ratio of the low Tg hydrophobic monomers to the high Tg hydrophilic monomers that ranges from 5:95 to 30:70. In this example, the low Tg hydrophobic monomers can dissolve in the high Tg hydrophilic monomers. In yet another example, the latex particles can be prepared by polymerizing the low Tg hydrophobic monomers, then adding the high Tg hydrophilic monomers. In this example, the polymerization process can cause a higher concentration of the high Tg hydrophilic monomers to polymerize at or near the surface of the low Tg hydrophobic component. In still another example, the latex particles can be prepared by copolymerizing the low Tg hydrophobic monomers and the high Tg hydrophilic monomers, then adding additional high Tg hydrophilic monomers. In this example, the copolymerization process can cause a higher concentration of the high Tg hydrophilic monomers to copolymerize at or near the surface of the low Tg hydrophobic component.

Other suitable techniques, specifically for generating a core-shell structure, can include grafting a hydrophilic shell onto the surface of a hydrophobic core, copolymerizing hydrophobic and hydrophilic monomers using ratios that lead to a more hydrophilic shell, adding hydrophilic monomer (or excess hydrophilic monomer) toward the end of the copolymerization process so there is a higher concentration of hydrophilic monomer copolymerized at or near the surface, or any other method can be used to generate a more hydrophilic shell relative to the core.

In one specific example, the low Tg hydrophobic monomers can be selected from the group consisting of C4 to C8 alkyl acrylate monomers, C4 to C8 alkyl methacrylate monomers, styrene monomers, substituted methyl styrene monomers, vinyl monomers, vinyl ester monomers, and combinations thereof; and the high Tg hydrophilic monomers can be selected from acidic monomers, unsubstituted amide monomers, alcoholic acrylate monomers, alcoholic methacrylate monomers, C1 to C2 alkyl acrylate monomers, C1 to C2 alkyl methacrylate monomers, and combinations thereof. The resulting polymer latex particles can exhibit a core-shell structure, a mixed or intermingled polymeric structure, or some other morphology.

In some examples, the latex polymer can have a weight average molecular weight (Mw) that can range from about 5,000 Mw to about 2,000,000 Mw. In yet other examples, the weight average molecular weight can range from about 100,000 Mw to about 1,000,000 Mw, from about 100,000 Mw to about 500,000 Mw, from about 150,000 Mw to about 300,000 Mw, or from about 50,000 Mw to about 250,000 Mw. Weight average molecular weight (Mw) can be measured by Gel Permeation Chromatography with polystyrene standard.

In some examples, the latex polymer particles can be latent and can be activated by heat (applied iteratively or after green body formation). In these instances, the activation temperature can correspond to the minimum film formation temperature (MFFT) or a glass transition temperature (Tg) which can be greater than ambient temperature. As mentioned herein, "ambient temperature" may refer to room temperature (e.g., ranging about 18° C. to about 22° C.). In one example, the latex polymer particles can have a MFFT or Tg that can be at least about 15° C. greater than ambient temperature. In another example, the MFFT or the Tg of the bulk material (e.g., the more hydrophobic portion) of the latex polymer particles can range from about 25° C. to about 200° C. In another example, the latex particles can have a MFFT or Tg ranging from about 40° C. to about 120° C. In yet another example, the latex polymer particles can have a MFFT or Tg ranging from about 50° C. to about 150° C. In a further example, the latex polymer particles can have a Tg that can range from about −20° C. to about 130° C., or in another example from about 60° C. to about 105° C. At a temperature above the MFFT or the Tg of a latent latex polymer particle, the polymer particles can coalesce and can bind materials.

The latex particles can have a particle size that can be jetted via thermal ejection or printing, piezoelectric ejection or printing, drop-on-demand ejection or printing, continuous ejection or printing, etc. In an example, the particle size of the latex particles can range from about 10 nm to about 400 nm. In yet other examples, a particle size of the latex particles can range from about 10 nm to about 300 nm, from about 50 nm to about 250 nm, from about 100 nm to about 300 nm, or from about 25 nm to about 250 nm.

In the various binder fluids described herein, these fluids can be aqueous fluids, and can include liquid vehicle ingredients, such as water, organic co-solvents, biocides, viscosity modifiers, pH adjusters, sequestering agents, preservatives, latex polymer, etc. More detail regarding the liquid vehicles that can be used is provided hereinafter.

Binder Fluids and Adhesion Promoter Fluids

Turning now to the fluids that can be prepared in accordance with the present disclosure, in addition to the particulate build material, the kits and methods described herein can include a binder fluid including latex particles, and in some instances a separate adhesion promoter fluid. If the binder fluid also includes the amine-bearing phosphonic adhesion promoter described herein, then there may or may not be a separate adhesion promoter fluid. If, however, there is no amine-bearing phosphonic adhesion promoter in the binder fluid, then the 3D printing kits and methods of 3D printing described herein will include an adhesion promoter fluid that contains the amine-bearing phosphonic adhesion promoter. In other words, the amine-bearing phosphonic adhesion promoter and the latex particles are included in the system either together in a common binder fluid, or in separate fluids as a binder fluid and an adhesion promoter fluid, or the amine-bearing phosphonic adhesion promoter can be included in the binder fluid and there may still further be a separate adhesion promoter fluid.

Regardless of whether the binder fluid delivers both the latex particles and the amine-bearing phosphonic adhesion promoter to the particulate build material, or whether the binder fluid delivers the latex particles and a separate adhesion promoter fluid delivers the amine-bearing phosphonic adhesion promoter, there are weight ratios of latex particles to amine-bearing phosphonic adhesion promoter within a layer of the particulate build material that can be effective for enhancing tensile strength of the 3D green body object prior to fusing. For example, the weight ratio of latex particles to amine-bearing phosphonic adhesion promoter when applied to the particulate build material can be from about 10:1 to about 100:1, from about 15:1 to about 80:1, or from about 20:1 to about 70:1. If there are two fluids used, namely a binder fluid and an adhesion promoter fluid, these fluids can be formulated to deliver the latex particles from the binder fluid and the amine-bearing phosphonic adhesion promoter from the adhesion promoter fluid at a binder fluid to adhesion promoter weight ratio of about 5:1 to about 1:5, from about 2:1 to about 1:2, or at about 1:1. The respective fluids can be formulated to deliver volumes of fluid sufficient so that some mixing can occur when applied to the particulate build material.

Regardless of where the latex particles reside relative to the amine-bearing phosphonic adhesion promoter, these fluids can be aqueous fluids in the form of aqueous dispersions or solutions carried by an aqueous liquid vehicle. The aqueous liquid vehicles can make up about 60 wt % to about 90 wt % of the binder fluid (with or without the amine-bearing phosphonic adhesion promoter), and if there is a separate adhesion promoter fluid, the aqueous liquid vehicle can make up about 80 wt % to about 99.9 wt % of the adhesion promoter fluid. In other examples, the aqueous liquid vehicle can be included in the binder fluid at from about 60 wt % to about 85 wt %, from about 60 wt % to about 80 wt %, from about 75 wt % to about 90 wt %, or from about 70 wt % to about 80 wt %, based on a total weight of the binder fluid. In further detail, if there is a separate adhesion promoter fluid, the aqueous liquid vehicle can be included in this fluid at from about 80 wt % to about 99 wt %, from about 80 wt % to about 95 wt %, from about 90 wt % to about 98 wt %, or from about 85 wt % to about 95 wt %, based on a total weight of the adhesion promoter fluid.

In some examples, the aqueous liquid vehicle(s) can include water, co-solvents, dispersing agents, biocides, viscosity modifiers, pH adjusters, sequestering agents, preservatives, and the like. In one example, water can be present at from about 30 wt % to 100 wt % of the liquid vehicle component-excluding latex binder and amine-bearing phosphonic adhesion promoter-based on a total weight of the aqueous liquid vehicle. In other examples, the water can be present at from about 60 wt % to about 95 wt %, from about 75 wt % to 100 wt %, or from about 80 wt % to about 99 wt %, based on a total weight of the aqueous liquid vehicle.

The co-solvent can be present at from about 0.5 wt % to about 50 wt % in the aqueous liquid vehicle, based on a total weight of the binder fluid or the total weight of the adhesion promoter fluid. In some examples, the co-solvent can be a high boiling point solvent, which can have a boiling point of at least about 110° C. Example co-solvents can include aliphatic alcohols, aromatic alcohols, alkyl diols, glycol ethers, polyglycol ethers, 2-pyrrolidinones, caprolactams, formamides, acetamides, long chain alcohols, and combinations thereof. For example, the co-solvent can include aliphatic alcohols with a —CH$_2$OH group, secondary aliphatic alcohols, 1,2-alcohols, 1,3-alcohols, 1,5-alcohols, ethylene glycol alkyl ethers, propylene glycol alkyl ethers, C6 to C12 homologs of polyethylene glycol alkyl ethers, N-alkyl caprolactams, unsubstituted caprolactams, both substituted and unsubstituted formamides, both substituted and unsubstituted acetamides, combinations thereof, and the like. Other example organic co-solvents can include propyleneglycol ether, dipropyleneglycol monomethyl ether, dipropyleneglycol monopropyl ether, dipropyleneglycol monobutyl ether, tripropyleneglycol monomethyl ether, tripropyleneglycol monobutyl ether, dipropyleneglycol monophenyl ether, 2-pyrrolidinone, 2-methyl-1,3-propanediol, and combinations thereof.

If a surfactant is included, examples can include SURFYNOL® SEF, SURFYNOL® 104, or SURFYNOL® 440 (Evonik Industries AG, Germany); CRODAFOST N3 Acid or BRIJ® 010 (Croda International Plc., Great Britain); TERGITOL® TMN6, TERGITOL® 15S5, TERGITOL® 15S7, DOWFAX® 2A1, or DOWFAX® 8390 (Dow, USA); or a combination thereof. The surfactant or combinations of surfactants can be present in the binder fluid and/or the adhesion promoter fluid at from about 0.1 wt % to about 5 wt % in its respective fluid based on the total fluid content weight, and in some examples, can be present at from about 0.5 wt % to about 2 wt %. With respect to antimicrobials, any compound suitable to inhibit the growth of harmful microorganisms can be included. These additives may be biocides, fungicides, and other microbial agents. Examples of suitable microbial agents can include, but are not limited to, NUOSEPT® (Troy, Corp.), UCARCIDE™, KORDEK™, ROCIMA™, KATHON™ (all available from The Dow Chemical Co.), VANCIDE® (R.T. Vanderbilt Co.), PROXEL® (Arch Chemicals), ACTICIDER B20 and ACTICIDER M20 and ACTICIDER MBL (blends of 2-methyl-4-isothiazolin-3-one (MIT), 1,2-benzisothiazolin-3-one (BIT), and Bronopol (Thor Chemicals); AXIDE™ (Planet Chemical); NIPACIDE™ (Clariant), etc. Sequestering agents such as EDTA (ethylene diamine tetra acetic acid) may be included to eliminate the deleterious effects of heavy metal impurities, and buffer solutions may be used to control the pH of the ink. Viscosity modifiers and buffers may also be present, as well as other additives to modify properties of the respective fluids.

In some examples, the aqueous liquid vehicle(s) can include from about 0.1 wt % to about 1 wt % of an anti-kogation agent, based on a total weight percentage of the binder fluid, the total weight of the amine-bearing phosphonic adhesion promoter, or both if both are present in a common aqueous liquid vehicle. Kogation refers to the deposit of dried solids on a printhead. An anti-kogation agent can be included to prevent the buildup of dried solids on the printhead. Examples of suitable anti-kogation agents can include oleth-3-phosphate (commercially available as CRODAFOS™ O3A or CRODAFOST N-3 acid), dextran 500k, CRODAFOS™ HCE (phosphate-ester from Croda Int.), CRODAFOS® N10 (oleth-10-phosphate from Croda Int.), or DISPERSOGEN® LFH (polymeric dispersing agent with aromatic anchoring groups, acid form, anionic, from Clariant), etc.

Three-Dimensional Printing Kits, Multi-Fluid Kits, and Methods of Three-Dimensional Printing In further detail, as shown in FIG. 1A, a 3D printing kit 100 can include a particulate build material 110 including from about 80 wt % to 100 wt % metal particles based on the total weight of the particulate build material; and a binder fluid 120 including water and latex particles in an amount of from about 5 wt % to about 30 wt % based on the total weight of the binder fluid. In one example, the binder fluid can also include an amine-bearing phosphonic adhesion promoter in an amount of from about 0.05 wt % to about 3.5 wt % based on the total weight of the binder fluid. In another example, the 3D printing kit can include the amine-bearing phosphonic adhesion promoter in a separate fluid, namely an adhesion promoter fluid 130 which includes water and an amine-bearing phosphonic adhesion promoter in an amount of from about 0.1 wt % to about 5 wt % based on the total weight of the adhesion promoter fluid. Thus, the 3D printing kit includes the particulate build material, and the printing kit further includes one or two fluids to deliver latex particles and amine-bearing phosphonic adhesion promoter to the particulate build material, either in a single fluid or in a combination of multiple fluids. As a note, in examples where there is a separate adhesion promoter fluid, the amine-bearing phosphonic adhesion promoter can be in both fluids or simply in the adhesion promoter fluid.

Figure 1B:
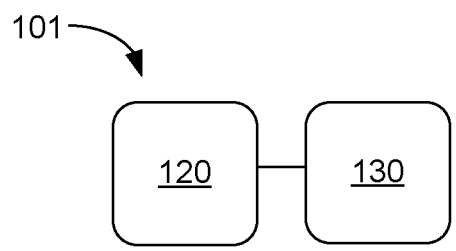
FIG. 1B schematically illustrates example multi-fluid kits for three-dimensional printing in accordance with the present disclosure.

As shown in FIG. 1B, a multi-fluid kit 101 can include a binder fluid 120 including water and latex particles in an amount of from about 5 wt % to about 30 wt % based on the total weight of the binder fluid. The multi-fluid kit can also include an adhesion promoter fluid 130 including water and an amine-bearing phosphonic adhesion promoter in an amount of from about 0.1 wt % to about 5 wt % based on the total weight of the adhesion promoter fluid. Thus, the multi-fluid kit includes a binder fluid and an adhesion promoter fluid. As a note, the amine-bearing phosphonic adhesion promoter can be included both fluids or simply in the adhesion promoter fluid.

Figure 2:
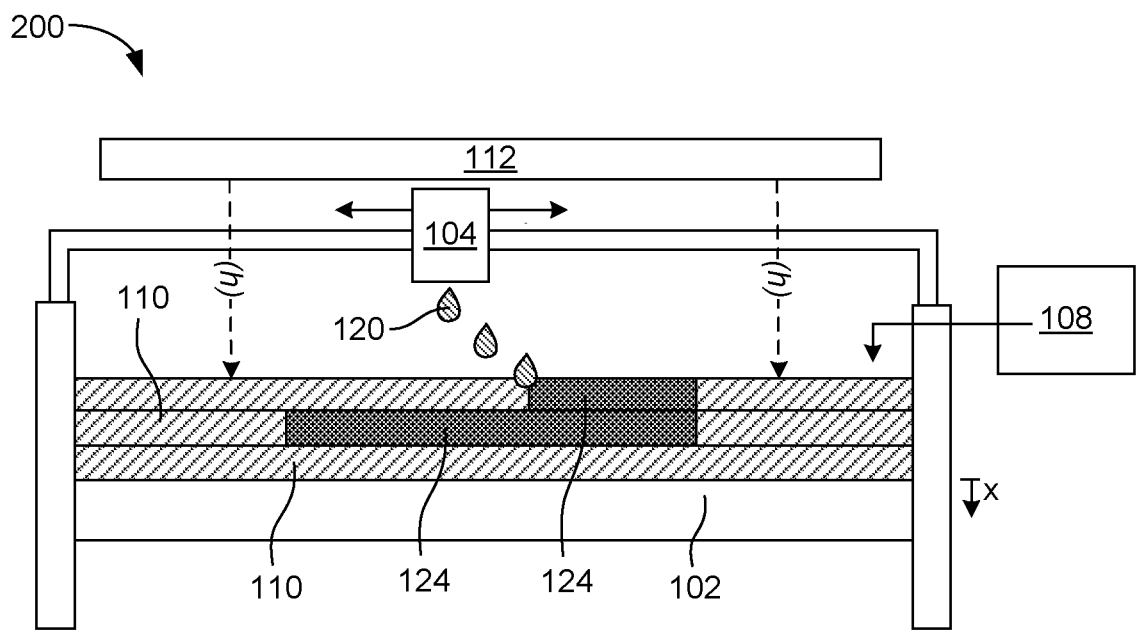
FIG. 2 graphically illustrates an example three-dimensional printing kit in example use in accordance with the present disclosure.

In FIG. 2, the 3D printing kit shown at 100 in FIG. 1A is shown by example in use with a printing system 200, where the particulate build material 110 is deposited from a particulate build material source 108 onto a build platform 102 where it can be flattened or smoothed, such as by a mechanical roller or other flattening technique. In this example, the binder fluid 120 includes both the latex particles and the amine-bearing phosphonic adhesion promoter, which can be ejected onto the particulate build material from a fluid ejector 104, for example, to provide for selectively pattering the particulate build material. The location of the selective printing of the binder fluid can be to a layer corresponding to a layer of a 3D printed object, such as from a 3D object model or computer model. Heat (h) can be used, such as from a heat source 112, at the various layers (or group of layers, or after the 3D green body object is formed) to remove solvent from the binder fluid, which can assist with more rapid solidification of individual layers. In one example, heat can be applied from overhead, e.g., prior to application of the next layer of particulate build material, or after multiple layers are formed, etc.), and/or can be provided by the build platform from beneath the particulate build material and/or from the particulate build material source (preheating particulate build material prior to dispensing on the build platform or previously applied 3D object layer. After individual layers are printed with binder fluid, which includes both the latex particle binder material and the amine-bearing phosphonic adhesion promoter, the build platform can be dropped a distance of (x), which can correspond to the thickness of a printed layer in one example, so that another layer of the particulate build material can be added thereon and printed with the binder fluid, etc. The process can be repeated on a layer by layer basis until a green body is formed that is stable enough to move to an oven suitable for fusing, e.g., sintering, annealing, melting, or the like. The green body in this example includes a 3D object formed from solidified green body object layers 124, which include both particulate build material and binder fluid that delivers the latex particles and the amine-bearing phosphonic adhesion promoter thereto.

Figure 3:
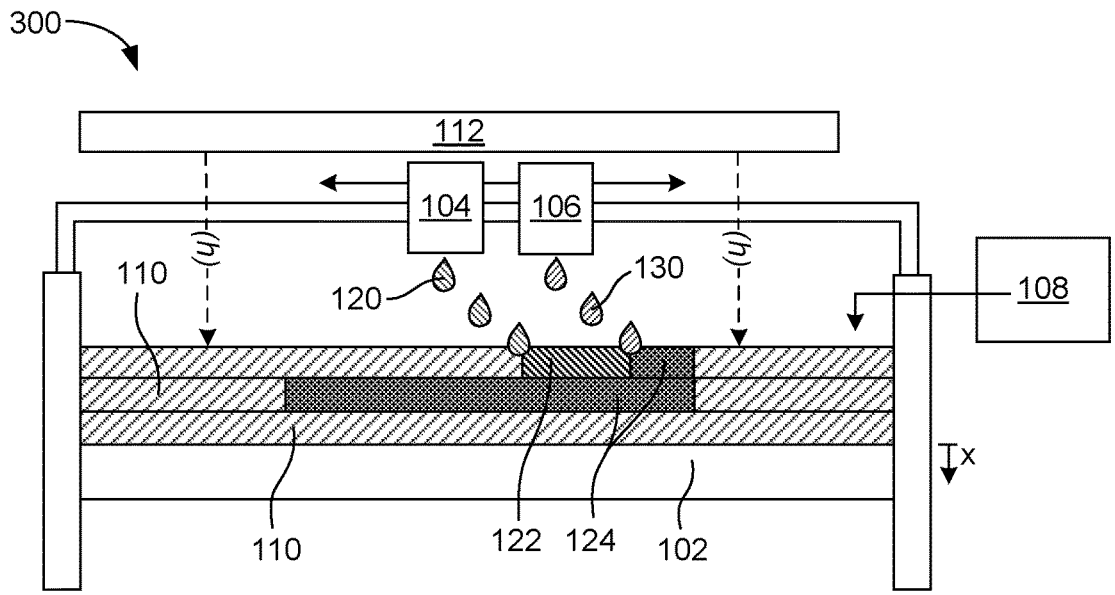
FIG. 3 graphically illustrates an alternative example three-dimensional printing kit or multi-fluid kit in example use in accordance with the present disclosure.

In FIG. 3, a 3D printing kit shown in the context of a printing system is shown at 300, which includes a particulate build material (e.g. particulate build material 110 of the 3D printing kit, or other particulate build material) is deposited from a particulate build material source 108 onto a build platform 102 where it can be flattened or smoothed, such as by a mechanical roller or other flattening technique. In this example, the binder fluid 120 includes the latex particles, but the amine-bearing phosphonic adhesion promoter is delivered from a separate adhesion promoter fluid 130, which can be separately ejected onto the particulate build material from a pair of fluid ejectors 104, 106, respectively. To provide for selectively patterning the particulate build material, the location of the selective printing of the binder fluid and adhesion promoter fluid can be to a layer corresponding to a layer of a 3D printed object, such as from a 3D object model or computer model. Heat (h) can be used, such as from a heat source 112, at the various layers (or group of layers, or after the green body is formed) to remove solvent from the binder fluid and the adhesion promoter fluid after application to the particulate build material, which can assist with more rapid solidification of individual layers. In one example, heat can be applied from overhead, e.g., prior to application of the next layer of particulate build material, or after multiple layers are formed, etc.), and/or can be provided by the build platform from beneath the particulate build material. After individual layers are printed with binder fluid and adhesion promoter fluid, the build platform can be dropped a distance of (x), which can correspond to the thickness of a printed layer so that another layer of the particulate build material can be added thereon and printed with additional binder fluid and adhesion promoter fluid. The process can be repeated on a layer by layer basis until a green body is formed that is stable enough to move to an oven suitable for fusing. The green body in this example includes a 3D object formed from solidified green body object layers 124, which includes the particulate build material, binder fluid that delivers the latex particles, and adhesion promoter that delivers the amine-bearing phosphonic adhesion promoter thereto. Also shown in this FIG. is an intermediate layer 122 which includes the particulate build material and the binder fluid in this example, as the adhesion promoter fluid has not yet come into contact with this intermediate layer. It should be noted that particularly when there are two separate fluids, one which carries latex binder and another that carries amine-bearing phosphonic adhesion promoter, the amine-bearing phosphonic adhesion promoter may not be applied to every place that the binder fluid is applied. For example, it may be the case that the adhesion promoter fluid could be reserved for areas where additional binding strength may be desired, and not used at other locations where the binder fluid is sufficient to provide the binding strength. Small detailed portions of a 3D object may benefit from additional adhesion or tensile strength, whereas in the center or core of a green body, the latex particles may be sufficient to provide binding without the use of the amine-bearing phosphonic adhesion promoter. Thus, the use of two separate fluids provides some additional flexibility with respect to modulating binding strength or tensile strength for use on an as needed basis.

The ejector(s) can deposit fluid(s) in a layer that corresponds to the layers of the 3D object, and can be used to form a green body 3D object in any orientation. For example, the 3D object can be printed from bottom to top, top to bottom, on its side, at an angle, or any other orientation. The orientation of the 3D object can also be formed in any orientation relative to the layering of the particulate build material. For example, the 3D object can be formed in an inverted orientation or on its side relative to the build layering within the particulate build material. The orientation of build or the orientation of the 3D object to be built within the particulate build material can be selected in advance or even by the user at the time of printing, for example.

Figure 4:
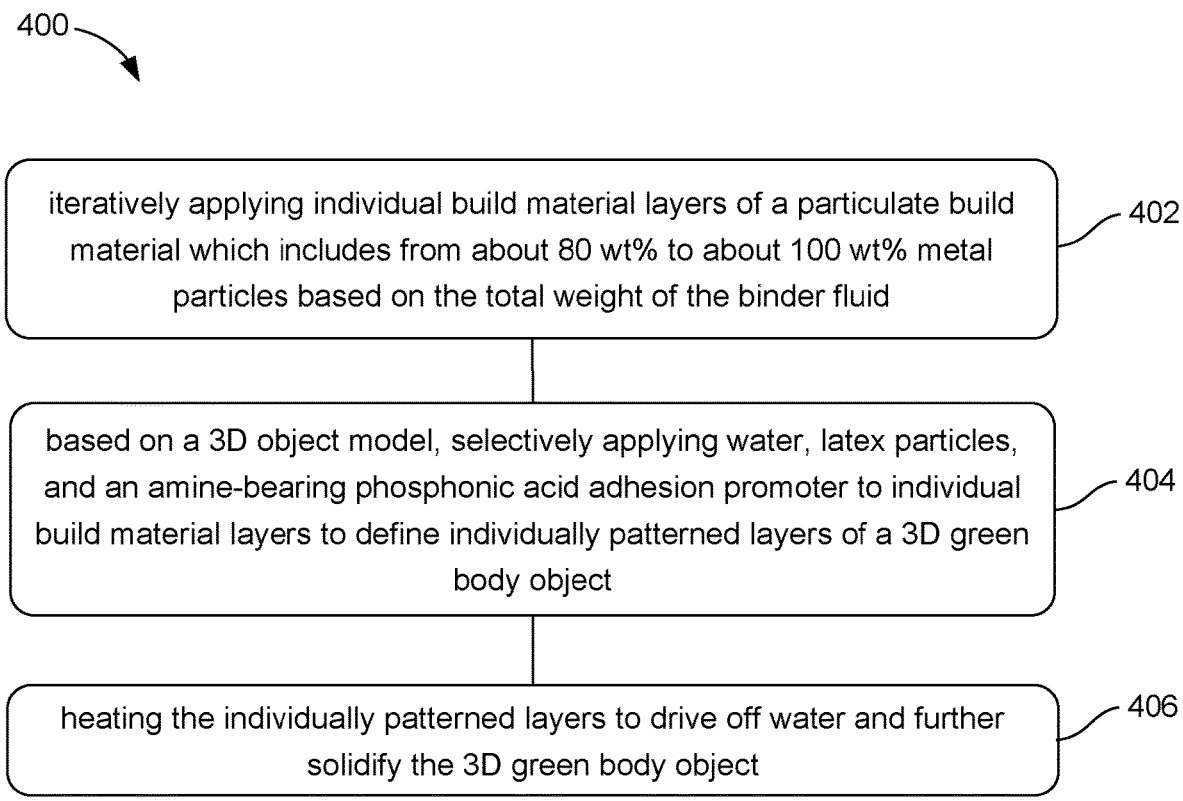
FIG. 4 is a flow diagram illustrating an example method of three-dimensional printing in accordance with the present disclosure.

In another example, as shown in FIG. 4, a method 400 of three-dimensional printing can include iteratively applying 402 individual build material layers of a particulate build material which includes from about 80 wt % to 100 wt % metal particles based on the total weight of the binder fluid, and based on a 3D object model, selectively applying 404 water, latex particles, and an amine-bearing phosphonic adhesion promoter to individual build material layers to define individually patterned layers of a 3D green body object. The method can further include heating 406 the individually patterned layers to drive off water and further solidify the 3D green body object.

The selectively applying of the water, latex particles, and the amine-bearing phosphonic adhesion promoter can be carried out using a single binder fluid (with the water, latex particles, and amine-bearing phosphonic adhesion promoter), or can be carried out using multiple fluids, with water and latex particles in the binder fluid and water and amine-bearing phosphonic adhesion promoter in a separate adhesion promoter fluid. More specifically, in the former example, the latex particles and the amine-bearing phosphonic adhesion promoter can be selectively applied by ejecting a binder fluid including water. The latex particles can be present at an amount of from about 1 wt % to about 40 wt % based on the total weight of the binder fluid and the amine-bearing phosphonic adhesion promoter can be present in an amount of about 0.05 wt % to about 3.5 wt % based on the total weight of the binder fluid. In the latter example, the latex particles can be selectively applied by ejecting a binder fluid including water and the latex particles in an amount of from about 1 wt % to about 40 wt % based on the total weight of the binder fluid, and the amine-bearing phosphonic adhesion promoter can be selectively applied by ejecting an adhesion promoter fluid as a separate fluid relative to the binder fluid. The adhesion promoter fluid can likewise include water, but further, the amine-bearing phosphonic adhesion promoter can be present in an amount of about 0.1 wt % to about 5 wt % based on the total weight of the adhesion promoter fluid.

Following application of the binder fluid (with amine-bearing phosphonic adhesion promoter included) or the binder fluid and the adhesion promotor fluid, the particulate build material and fluid(s) applied thereto can be heated to an elevated temperature to assist with solidifying the 3D green body object in preparation for moving to a fusing oven. In one example, heating can be carried out at from about 100° C. to about 250° C., about 120° C. to about 220° C., or about 150° C. to about 200° C. for time sufficient to solidify or stabilize the green body for movement to a fusing oven. Time frames for heating individual layers may be short, e.g., from about 0.5 second to about 120 seconds, for example. If heating the green body after it is fully formed, time frames can vary as well, depending on size of the green body, e.g., large objects with a smaller surface to volume ratio may take longer to drive off enough fluid to stabilize the green body than a smaller object with a larger surface to volume ratio. That stated, time frames for heating the green body after formation can be from about 10 minutes to about 8 hours, or from about 30 minutes to about 3 hours. In many cases, individual layers can be heated during the build, and furthermore, additional heating can occur after the green body is fully formed. In other words, one goal may be to generate a green body object that is stable enough to move after formation to a fusing oven. With the use of the amine-bearing phosphonic adhesion promoter with the latex particles, stability may be easier to achieve than with systems that do not use both components. In one specific example, it may be efficient to not fully cure every individual layer prior to applying the next green body layer, but rather coalesce the latex particles during printing (with perhaps some curing), and after building the green body as a whole or after building a large portion of the green body, e.g., at least 25% of the green body part, heating the green body further while still supported within the particulate build material. Depending on the size of the green body part or large portion thereof, heating after building can occur for 10 minutes to 8 hours, or from 30 minutes to 3 hours, for example, as mentioned previously.

Upon coalescing or otherwise binding of the particulate build material by the latex particles and the amine-bearing phosphonic adhesion promoter, the 3D object with enhanced tensile strength can be moved to a heating device, such as a fusing oven. In one example, the heating can be a temperature ranging from about 500° C. to about 3,500° C., including at a temperature within the range where the metal particles are fused together. In another example, the temperature can range from about 600° C. to about 1,500° C., or from about 800° C. to about 1200° C. In further detail, the fusing temperature range can vary, depending on the material, but in one example, the fusing temperature can range from about 10° C. below the melting temperature of the metal particles of the particulate build material to about 50° C. below the melting temperature of the metal particles of the particulate build material. In another example, the fusing temperature can range from about 100° C. below the melting temperature of the metal particles of the particulate build material to about 200° C. below the melting temperature of the metal particles of the particulate build material. The fusing temperature can depend upon the particle size and period of time that heating occurs, e.g., at a high temperature for a sufficient time to cause particle surfaces to become physically merged or composited together. For example, a fusing temperature for stainless steel can be about 1400° C. and an example of a fusing temperature for aluminum or aluminum alloys can range from about 550° C. to about 620° C. Temperatures outside of these ranges can be used as determined on a case by case basis.

During heating in the oven, the heating device can include an inert atmosphere to avoid oxidation of the metal particles. In one example, the inert atmosphere can be oxygen-free and can include a noble gas, an inert gas, or combination thereof. For example, the inert atmosphere can include a noble gas or an inert gas selected from argon, nitrogen, helium, neon, krypton, xenon, radon, hydrogen, or a combination thereof. Upon removal of the fused 3D object from the oven and cooling (or annealing by controlling the cool down rate in the oven), the fused 3D object can be treated or polished, such as by sand blasting, bead blasting, air jetting, tumble finishing such as barrel finishing, vibratory finishing, or a combination thereof. Tumble or vibratory finishing techniques can be performed wet (involving liquid lubricants, cleaners, or abrasives) or dry.

DEFINITIONS

It is noted that, as used in this specification and the appended claims, the singular forms "a," "an," and "the" include plural referents unless the content clearly dictates otherwise.

The term "about" as used herein, when referring to a numerical value or range, allows for a degree of variability in the value or range, for example, within 10%, or, in one aspect within 5%, of a stated value or of a stated limit of a range. The term "about" when modifying a numerical range is also understood to include as one numerical subrange a range defined by the exact numerical value indicated, e.g., the range of about 1 wt % to about 5 wt % includes 1 wt % to 5 wt % as an explicitly supported sub-range.

As used herein, "devoid" refers to a numerical quantity that can be zero or can be substantially zero, e.g., a quantity may be permissible in trace amounts, such as up to 0.1 wt % of a formulation or composition.

As used herein, the term "green" when referring to a green part, green body, 3D green body object, green body layer, etc. refers to any intermediate structure that has been solidified and/or cured (prior to heat fusing), furthermore, a green body object can include particulate build material, latex particles, and amine-bearing phosphonic adhesion promoter. The latex particles can be used to bind the particulate build material together, and the amine-bearing phosphonic adhesion promoter can be present at locations where the latex particles are deposited or at a plurality of locations where the latex particles are applied. The term "green body" generally is used to refer to a multi-layered object that is (weakly) bound together, but upon some water removal, can exhibit sufficient tensile strength to be moved to a fusing oven, for example. It is to be understood that any build material that is not patterned with at least binder fluid is not considered to be part of the green body, even if it is adjacent to or surrounds the green body. For example, unprinted particulate build material acts to support the green body while contained therein, but the particulate build material is not part of the green body unless it is printed with binder fluid (or binder fluid along with an adhesion promoter fluid) to generate a solidified part prior to fusing.

As used herein, the terms "3D part," "3D object," or the like, refers to the target 3D object that is being built, and can be a green body 3D object or a fused 3D object, depending on the context. However, in some instances, for clarity, the 3D object can be referred to as a "fused" 3D object, indicating it has been fused, e.g., sintered, annealed, melted, etc., or a "green body," "3D green body object," or "green" 3D object, indicating it has been solidified or in the process of solidification sufficient for movement, but not yet heat fused.

"Binder fluid" refers to a fluid that includes water and latex particles that are effective for binding layers of particulate build material when forming a green body. The binder fluid is typically applied to form a 3D green body object, and in some cases, can include an amine-bearing phosphonic adhesion promoter, particularly if there is not a separate adhesion promoter fluid present.

"Adhesion promoter fluid" refers to a fluid that includes water and amine-bearing phosphonic adhesion promoter. The adhesion promoter fluid may or may not be present in a 3D printing kit or related methods of 3D printing, as the amine-bearing phosphonic adhesion promoter may already be present in the binder fluid.

The term "fluid" does not infer that the composition is free of particulate solids, but rather, can include solids dispersed therein, including carbon black pigment, latex particles, or other solids that are dispersed in the liquid vehicle of the fluid.

As used herein, "material set" or "kit" can be synonymous with and understood to include a plurality of compositions including one or more components where the different compositions can be separately contained in one or more containers prior to and/or during use, e.g., building a green 3D object for subsequent fusing. These compositions of the "kit" can be combined together during a 3D build process. The containers can be any type of a vessel, box, or receptacle made of any material.

The term "fuse," "fusing," "fusion," or the like refers to the joining of the material of adjacent particles of a particulate build material, such as by sintering, annealing, melting, or the like, and can include a complete fusing of adjacent particles into a common structure, e.g., melting together, or can include surface fusing where particles are not fully melted to a point of liquefaction, but which allow for individual particles of the particulate build material to become bound to one another, e.g., forming material bridges between particles at or near a point of contact.

As used herein, a plurality of items, structural elements, compositional elements, and/or materials may be presented in a common list for convenience. However, these lists should be construed as though the various members of the list are individually identified as a separate and unique member. Thus, no individual member of such list should be construed as a de facto equivalent of any other member of the same list based on their presentation in a common group without indications to the contrary.

Concentrations, dimensions, amounts, and other numerical data may be presented herein in a range format. It is to be understood that such range format is used merely for convenience and brevity and should be interpreted flexibly to include the numerical values explicitly recited as the limits of the range, as well as to include all the individual numerical values or sub-ranges encompassed within that range as if the various numerical values and sub-ranges are explicitly recited. For example, a weight ratio range of about 1 wt % to about 20 wt % should be interpreted to include the explicitly recited limits of 1 wt % and 20 wt % and to include individual weights such as about 2 wt %, about 11 wt %, about 14 wt %, and sub-ranges such as about 10 wt % to about 20 wt %, about 5 wt % to about 15 wt %, etc.

EXAMPLES

The following illustrates examples of the present disclosure. However, it is to be understood that the following are illustrative of the application of the principles of the present disclosure. Numerous modifications and alternative compositions, methods, and systems may be devised without departing from the spirit and scope of the present disclosure. The appended claims are intended to cover such modifications and arrangements.

Example 1—Preparation of Binder Fluids

To evaluate the tensile strength of various binder fluids, the following binder fluid formulations were prepared, according to Table 2:

TABLE 2

| | Binder Fluids | | | | | | | | |
|---|---|---|---|---|---|---|---|---|---|
| Binder Fluid Components | B0 (control) | B1 | B2 | B3 | B4 | B5 | B6 | B7 | B8 |
| 1,2-Butanediol | 26.0 | 26.0 | 26.0 | 26.0 | 26.0 | 26.0 | 26.0 | 26.0 | 26.0 |
| Tergitol ® TMN-6 | 0.30 | 0.30 | 0.30 | 0.30 | 0.30 | 0.30 | 0.30 | 0.30 | 0.30 |
| JDP Cyan H-CB Liquid | 0.40 | 0.40 | 0.40 | 0.40 | 0.40 | 0.40 | 0.40 | 0.40 | 0.40 |
| HP787 | 16.0 | 16.0 | 16.0 | 16.0 | 16.0 | 16.0 | 16.0 | 16.0 | 16.0 |
| Aminopropyl Phosphonic Acid (APPA) | — | 0.45 | 0.68 | — | — | — | — | — | — |
| 2,3-Dimercapto-succinic Acid (DMSA) | — | — | — | 0.45 | 0.68 | — | — | — | — |
| EDTA | — | — | — | — | — | 0.45 | 0.68 | — | — |
| Nitrilotriacetic Acid (NTAA) | — | — | — | — | — | — | — | 0.45 | 0.68 |
| Water | Balance | Bal. | Bal. | Bal. | Bal. | Bal. | Bal. | Bal. | Bal. |

Tergitol ® is available from Sigma Aldrich (USA);
HP787 is a copolymer latex of methyl methacrylate, styrene, and methacrylic acid (Tg is about 90° C. and particle size is about 200 nm);
JDP Cyan H-CB Liquid is a cyan ink that was used for visual inspection of powder mixing quality.

Example 2—Tensile Strength

Figure 5:
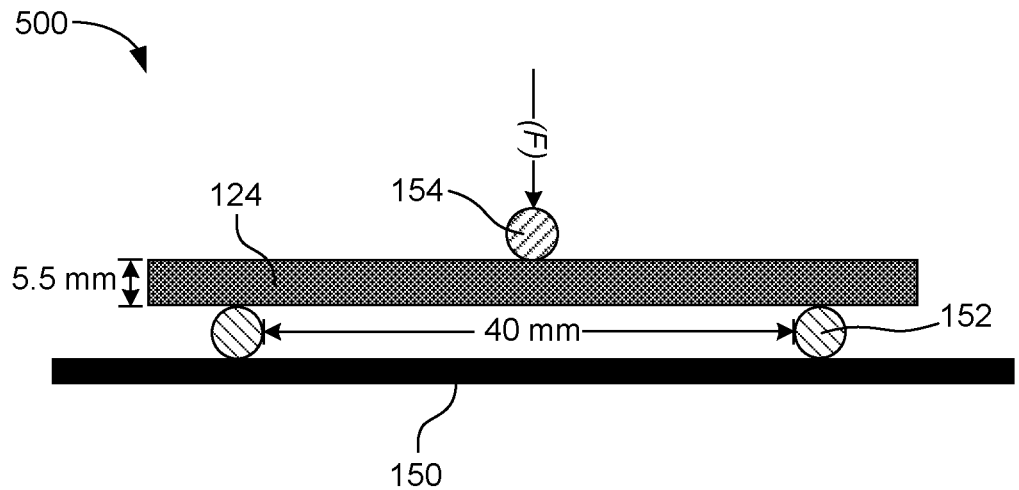
FIG. 5 illustrates an example tensile strength apparatus that can be used to evaluate tensile strength provided by various compositions for use in 3D printing in accordance with the present disclosure.

A tensile strength test was conducted, as shown at 500 in FIG. 5, where the binder fluids prepared in accordance with Table 2 were used to prepare press bar samples 124, which were solidified green body samples such as those shown in FIGS. 2 and 3. The individual press bar samples included particulate build material with 100 wt % stainless steel particles having a D50 particle size of about 22 μm admixed with the various binder fluids of Table 2. To prepare the individual samples for tensile strength testing, a mixture of the stainless steel particles and various binder fluids were mixed in a high speed mixer to ensure homogenous mixing at a weight ratio of about 19:1 (94.8 wt % stainless steel particles; 5.2 wt % binder fluid) and then the wet particles/binder homogeneous mixture was dried in a vacuum oven at 40° C. for two hours to remove most of the water content, leaving a dried homogenous mixture of binder solids and stainless steel particles. 18 g of the dried homogenous mixture was poured into the opening of a press bar mold and pressed under 1000 psi for 30 seconds to form the respective press bar samples. The dimension of the press bar samples, shown at 124 in FIG. 5, was 50 mm (length) by 12 mm (width) by 5.5 mm (thickness). The individual press bar samples were then carefully separated from the mold and cured in a vacuum oven at 180° C. at 22-25 in Hg for 30 minutes with a slow stream of air to provide for removal of solvents and some or even full curing of latex binder. The individual cured press bar samples were then cooled and submitted to a 3-point bend Instron® tester, as shown by example in FIG. 5, to measure their tensile strength. The Instron® tester, available from Instron (USA), included a support 150, supporting pins 152, and a loading pin 154 which applied increasing force (F) to the individual press bar samples until they failed (broke under force). For the various individual press bar samples, at least five press bars were made and the average maximum tensile stress (mPa) and standard deviation were reported. The average data of this study is provided in Table 3, and the average data and standard deviation data of this study is provided in FIG. 6.

moter) in binder fluids B1 and B2 can be effective in enhancing the strength of the press bar.

Example 3—Preparation of Adhesion Promoter Fluids

The Control Binder Fluid (B0) of Table 3 in Example 2 above can be used as a binder fluid for preparing 3D green body objects for subsequent sintering in high temperature ovens. However, in accordance with examples of the present disclosure, without the presence of a suitable adhesion promoter therein, a separate adhesion promoter fluid can be formulated to print separately onto various layers of particulate build material, such as the 22 μm stainless steel particles, e.g., powder, described above. Example binder fluids and adhesion promoter fluids are provided by way of example in Table 4 below that can be printed at about a 1:1 weight ratio with the Control Binder Fluid (B0) of Table 3. Other formulations can also be prepared for printing at other weight ratios, and thus, the following formulations are provided by way of example.

TABLE 4

Adhesion Promotor Fluids

| Adhesion Promoter Fluid Components | AP0 | AP1 | AP2 | AP3 | AP4 | AP5 | AP6 | AP7 | AP8 |
|---|---|---|---|---|---|---|---|---|---|
| MP-Diol | 9.6 | 9.6 | 9.6 | 9.6 | 9.6 | 9.6 | 9.6 | 9.6 | 9.6 |
| 2-Pyrrolidone | 17 | 17 | 17 | 17 | 17 | 17 | 17 | 17 | 17 |
| Tergitol ® 15-S-7 | 0.9 | 0.9 | 0.9 | 0.9 | 0.9 | 0.9 | 0.9 | 0.9 | 0.9 |
| Tergitol ® TMN-6 | 0.9 | 0.9 | 0.9 | 0.9 | 0.9 | 0.9 | 0.9 | 0.9 | 0.9 |
| Capstone ® FS-35 | 0.5 | 0.5 | 0.5 | 0.5 | 0.5 | 0.5 | 0.5 | 0.5 | 0.5 |
| Aminopropyl Phosphonic Acid (APPA) | — | 0.45 | 0.68 | — | — | — | — | — | — |
| 2,3-Dimercapto-succinic Acid (DMSA) | — | — | — | 0.45 | 0.68 | — | — | — | — |
| EDTA | — | — | — | — | — | 0.45 | 0.68 | — | — |
| Nitrilotriacetic Acid (NTAA) | — | — | — | — | — | — | — | 0.45 | 0.68 |
| Water | Bal. | Bal. | Bal. | Bal. | Bal. | Bal. | Bal. | Bal. | |

Tergitol ® is available from Sigma Aldrich (USA); and
Capstone ® is available from DuPont (USA).

TABLE 3

Average Maximum Tensile Stress of Cured Press Bar Samples

| Press Bar Sample ID | Adhesion Promoter ID and Content from Binder Fluid | Maximum Tensile Stress (mPa) |
|---|---|---|
| PB0 | Control | 8.88 |
| PB1 | 0.45% APPA | 11.44 |
| PB2 | 0.68% APPA | 11.48 |
| PB3 | 0.45% DMSA | 4.68 |
| PB4 | 0.68% DMSA | 4.42 |
| PB5 | 0.45% EDTA | 4.47 |
| PB6 | 0.68% EDTA | 4.89 |
| PB7 | 0.45% NTAA | 8.18 |
| PB8 | 0.68% NTAA | 8.35 |

Binder Fluid IDs from Table 2 corresponds numerically with Press Bar Sample IDs from Table 3, e.g., B0 without an adhesion promoter was used to form Press Bar Sample PB0, B1 with 0.45% APPA was used to prepare Press Bar Sample PB1, etc. Furthermore, the weight percentages shown in Table 3 are based on the binder fluid content, not the content present in final press bar sample.

Figure 6:
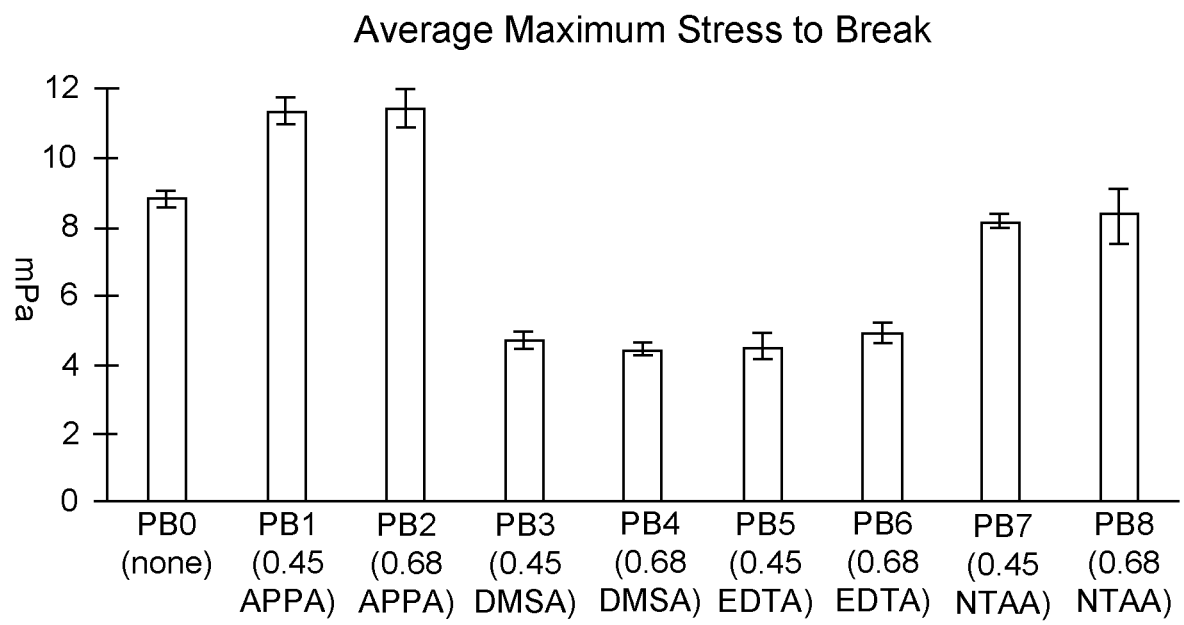
FIG. 6 provides a graph of data related to tensile strength provided by various binder fluid compositions for use in 3D printing in accordance with the present disclosure.

As can be seen from Table 3 and FIG. 6, binder fluids B3-B8 did not enhance the strength of the press bar relative to the control binder fluid B0. However, just a small quantity of APPA (an amine-bearing phosphonate adhesion pro- Example 4—Tensile Strength A tensile strength test was conducted as described in Example 2 above, except that Control Binder Fluid (B0) of Table 3 was printed in about a 1:1 ratio with Adhesion Promoter Fluids of Table 4 to prepare the press bars.

TABLE 5

Average Maximum Tensile Stress of Cured Press Bar Samples

| Press Bar Sample ID | Adhesion Promoter ID and Content from Adhesion Promoter Fluid | Maximum Tensile Stress (mPa) |
|---|---|---|
| PAP0 | Control | 5.06 |
| PAP1 | 0.45% APPA | 7.15 |
| PAP2 | 0.68% APPA | 7.48 |
| PAP3 | 0.45% DMSA | 4.17 |
| PAP4 | 0.68% DMSA | 4.11 |
| PAP5 | 0.45% EDTA | 4.05 |
| PAP6 | 0.68% EDTA | 3.83 |

TABLE 5-continued

Average Maximum Tensile Stress of Cured Press Bar Samples

| Press Bar Sample ID | Adhesion Promoter ID and Content from Adhesion Promoter Fluid | Maximum Tensile Stress (mPa) |
|---|---|---|
| PAP7 | 0.45% NTAA | 4.92 |
| PAP8 | 0.68% NTAA | 5.26 |

Adhesion Promoter Fluid IDs from Table 4 corresponds numerically with Press Bar Sample IDs from Table 5, e.g., AP0 without an adhesion promoter was used to form Press Bar Sample PAP0, AP1 with 0.45% APPA was used to prepare Press Bar Sample PAP1, etc. Furthermore, the weight percentages shown in Table 5 are based on the adhesion promoter fluid content, not the content present in final press bar sample.

Figure 7:
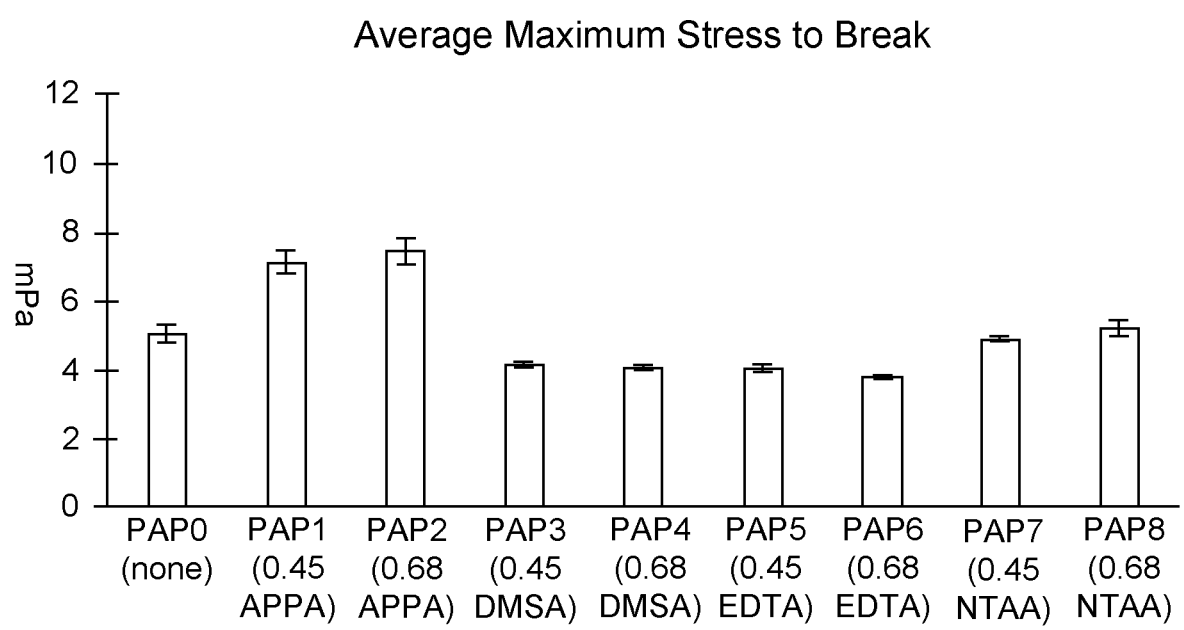
FIG. 7 provides a graph of data related to tensile strength provided by various adhesion promoter compositions for use in 3D printing in accordance with the present disclosure.

As can be seen from Table 5 and FIG. 7, adhesion promoter fluids AP3-AP8 (which did not contain an amine-bearing phosphonic adhesion promoter) did not enhance the strength of the press bar relative to the control adhesion promoter fluid AP0. However, just a small quantity of APPA (an amine-bearing phosphonate adhesion promoter) in adhesion promoter fluids AP1 and AP2 can be effective in enhancing the strength of the press bar.

What is claimed is:

1. A three-dimensional printing kit, comprising:
a particulate build material comprising from about 80 wt % to about 100 wt % metal particles; and
a binder fluid comprising water and latex particles present in an amount of from about 5 wt % to about 30 wt % based on a total weight of the binder fluid, and an amine-bearing phosphonic adhesion promoter included in the binder fluid in an amount of from about 0.05 wt % to about 3.5 wt % based on a total amount of the binder fluid, the latex particles including heteropolymers formed with a hydrophobic component and a hydrophilic component, wherein:
the hydrophobic component being a monomer selected from the group consisting of vinyl, vinyl chloride, vinylidene chloride, vinyl ester, acrylate, methacrylate, styrene, ethylene, maleate esters, fumarate esters, itaconate esters, α-methyl styrene, p-methyl styrene, methyl methacrylate, hexyl acrylate, hexyl methacrylate, butyl acrylate, butyl methacrylate, ethyl acrylate, ethyl methacrylate, propyl acrylate, propyl methacrylate, 2-ethylhexyl acrylate, 2-ethylhexyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, benzyl methacrylate, benzyl acrylate, ethoxylated nonyl phenol methacrylate, isobornyl methacrylate, cyclohexyl methacrylate, trimethyl cyclohexyl methacrylate, t-butyl methacrylate, n-octyl methacrylate, lauryl methacrylate, trydecyl methacrylate, alkoxylated tetrahydrofurfuryl acrylate, isodecyl acrylate, isobornylmethacrylate, isobornyl acrylate, dimethyl maleate, dioctyl maleate, acetoacetoxyethyl methacrylate, diacetone acrylamide, N-vinyl imidazole, N-vinylcarbazole, N-Vinyl-caprolactam, and combinations thereof; and
the hydrophilic component being a monomer selected from the group consisting of acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy) propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propane-sulfonic acid, and a combination thereof.

2. The three-dimensional printing kit of claim 1, wherein the metal particles have a D50 particle size distribution value of from about 1 μm to about 150 μm.

3. The three-dimensional printing kit of claim 1, wherein the metal particles are selected from the group consisting of aluminum particles, titanium particles, copper particles, cobalt particles, chromium particles, nickel particles, vanadium particles, tungsten particles, tungsten carbide particles, tantalum particles, molybdenum particles, magnesium particles, gold particles, silver particles, stainless steel particles, steel particles, an alloy thereof, and an admixture thereof.

4. The three-dimensional printing kit of claim 1, wherein the amine-bearing phosphonic adhesion promoter has the general formula:

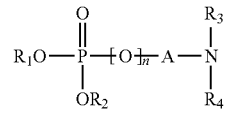

wherein:
$R_1$ and $R_2$ are independently hydrogen, linear or branched $C_1$-$C_5$ alkyl, or linear or branched $C_1$-$C_5$ alkyl amine;
A is linear or branched $C_1$-$C_{12}$ alkyl, or nitrogen-substituted linear or branched $C_2$-$C_{12}$ alkyl;
n is 0 or 1; and
$R_3$ and $R_4$ are independently hydrogen, $NH_2$, linear or branched $C_1$-$C_{10}$ alkyl, nitrogen-substituted linear or branched $C_1$-$C_{10}$ alkyl, linear or branched $C_1$-$C_{10}$ alkyl phosphonic acid, nitrogen-substituted linear or branched $C_1$-$C_{10}$ alkyl phosphonic acid, or linear or branched $C_1$-$C_5$ alkyl halide, or wherein $R_3$ and $R_4$ are joined to form a ring structure.

5. The three-dimensional printing kit of claim 1, wherein the amine-bearing phosphonic adhesion promotor is selected from the group consisting of aminomethyl phosphonic acid, 1-aminoethyl phosphonic acid, 2-aminoethyl phosphonic acid, 1-aminopropyl phosphonic acid, 2-aminopropyl phosphonic acid, 3-aminopropyl phosphonic acid, 1-aminobutyl phosphonic acid, 2-aminobutyl phosphonic acid, 4-aminobutyl phosphonic acid, 1-aminopentyl phosphonic acid, 5-aminopentyl phosphonic acid, 1-aminohexyl phosphonic acid, 6-aminohexyl phosphonic acid, and a combination thereof.

6. The three-dimensional printing kit of claim 1, wherein the amine-bearing phosphonic adhesion promoter has the general formula:

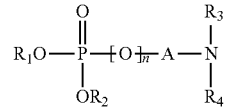

wherein:
R$^1$ and R$_2$ are independently hydrogen, linear or branched C$_1$-C$_5$ alkyl, or linear or branched C$_1$-C$_5$ alkyl amine;
A is linear or branched C$_1$-C$_{12}$ alkyl, or nitrogen-substituted linear or branched C$_2$-C$_{12}$ alkyl;
n is 1; and
R$_3$ and R$_4$ are independently hydrogen, NH$_2$, linear or branched C$_1$-C$_{10}$ alkyl, nitrogen-substituted linear or branched C$_1$-C$_{10}$ alkyl, linear or branched C$_1$-C$_{10}$ alkyl phosphonic acid, nitrogen-substituted linear or branched C$_1$-C$_{10}$ alkyl phosphonic acid, or linear or branched C$_1$-C$_5$ alkyl halide, or wherein R$_3$ and R$_4$ are joined to form a ring structure.

7. The three-dimensional printing kit of claim 1, wherein the binder fluid consists of the water, the latex particles, and the amine-bearing phosphonic adhesion promoter.

8. The three-dimensional printing kit of claim 1, wherein the latex particles have a particle size ranging from about 10 nm to about 400 nm.

9. The three-dimensional printing kit of claim 1, wherein a weight ratio of the latex particles to the amine-bearing phosphonic adhesion promoter ranges from about 20:1 to about 70:1.

10. The three-dimensional printing kit of claim 1, wherein the binder fluid has a liquid vehicle, and wherein the liquid vehicle comprises the water and at least one of a co-solvent and a surfactant.

11. The three-dimensional printing kit of claim 10, wherein the water makes up about 30 wt % to 99 wt % of the liquid vehicle.

12. A method of three-dimensional printing, comprising:
iteratively applying individual build material layers of a particulate build material which includes from about 80 wt % to about 100 wt % metal particles;
based on a 3D object model, selectively applying a binder fluid including water, latex particles present in an amount ranging from about 5 wt % to about 30 wt % based on a total weight of the binder fluid, and an amine-bearing phosphonic adhesion promoter present in an amount of from about 0.05 wt % to about 3.5 wt % based on a total weight of the binder fluid to individual build material layers to define individually patterned layers of a 3D green body object, the latex particles including heteropolymers formed with a hydrophobic component and a hydrophilic component, wherein:
the hydrophobic component being a monomer selected from the group consisting of vinyl, vinyl chloride, vinylidene chloride, vinyl ester, acrylate, methacrylate, styrene, ethylene, maleate esters, fumarate esters, itaconate esters, α-methyl styrene, p-methyl styrene, methyl methacrylate, hexyl acrylate, hexyl methacrylate, butyl acrylate, butyl methacrylate, ethyl acrylate, ethyl methacrylate, propyl acrylate, propyl methacrylate, 2-ethylhexyl acrylate, 2-ethylhexyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, benzyl methacrylate, benzyl acrylate, ethoxylated nonyl phenol methacrylate, isobornyl methacrylate, cyclohexyl methacrylate, trimethyl cyclohexyl methacrylate, t-butyl methacrylate, n-octyl methacrylate, lauryl methacrylate, trydecyl methacrylate, alkoxylated tetrahydrofurfuryl acrylate, isodecyl acrylate, isobornylmethacrylate, isobornyl acrylate, dimethyl maleate, dioctyl maleate, acetoacetoxyethyl methacrylate, diacetone acrylamide, N-vinyl imidazole, N-vinylcarbazole, N-Vinyl-caprolactam, and combinations thereof; and
the hydrophilic component being a monomer selected from the group consisting of acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy) propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, and a combination thereof; and
heating the individually patterned layers to drive off water and further solidify the 3D green body object.

13. The method of claim 12, wherein the heating occurs at a temperature ranging from about 100° C. to about 250° C. for a duration of about 5 minutes to about 2 hours.

14. The method of claim 13, further comprising separating the 3D green body object from the particulate build material and sintering the metal particles of the 3D green body object in an annealing oven.

* * * * *